(12) United States Patent
Higurashi

(10) Patent No.: US 7,661,001 B2
(45) Date of Patent: Feb. 9, 2010

(54) INFORMATION-SIGNAL ENCRYPTING APPARATUS AND INFORMATION-SIGNAL DECRYPTING APPARATUS

(75) Inventor: Seiji Higurashi, Fuchu (JP)

(73) Assignee: Victor Company of Japan, Ltd., Yokohama (JP)

(*) Notice: Subject to any disclaimer, the term of this patent is extended or adjusted under 35 U.S.C. 154(b) by 875 days.

(21) Appl. No.: 10/925,963

(22) Filed: Aug. 26, 2004

(65) Prior Publication Data
US 2005/0069139 A1 Mar. 31, 2005

(30) Foreign Application Priority Data
Sep. 26, 2003 (JP) ............... 2003-335372

(51) Int. Cl.
*G06F 11/30* (2006.01)
(52) U.S. Cl. .................. 713/193; 713/189; 711/163; 711/164; 327/545; 327/546; 726/1; 726/26; 726/34
(58) Field of Classification Search .............. 380/284; 713/193, 189; 711/163, 164; 327/545, 546; 726/1, 26, 34
See application file for complete search history.

(56) References Cited

U.S. PATENT DOCUMENTS 5,757,908 A * 5/1998 Cooper et al. ............... 713/165
6,075,862 A * 6/2000 Yoshida et al. ................ 380/28
6,243,796 B1 * 6/2001 Otsuka ........................ 711/163
6,834,348 B1 * 12/2004 Tagawa et al. ............... 713/193
7,174,564 B1 * 2/2007 Weatherspoon et al. ........ 726/2
2002/0076054 A1 * 6/2002 Fukutomi et al. ........... 380/277

FOREIGN PATENT DOCUMENTS

| JP | 9-238132 | 9/1997 |
| JP | 2002-169740 | 6/2002 |
| JP | 2002-232420 | 8/2002 |
| JP | 2003-087238 | 3/2003 |

* cited by examiner

*Primary Examiner*—Christian LaForgia
*Assistant Examiner*—Roderick Tolentino
(74) *Attorney, Agent, or Firm*—Louis Woo

(57) ABSTRACT

In an apparatus for encrypting an information signal into an encryption-resultant signal, a first encryption key peculiar to the present apparatus is generated. Key information is read out from a replaceable recording medium. A decision is made as to whether or not the read-out key information has been generated by an apparatus different from the present apparatus. A second encryption key is generated in response to the read-out key information when it is decided that the read-out key information has been generated by an apparatus different from the present apparatus. One is selected from the first encryption key and the second encryption key as a final encryption key. An information signal is encrypted in response to the final encryption key.

5 Claims, 10 Drawing Sheets

INFORMATION-SIGNAL ENCRYPTING APPARATUS AND INFORMATION-SIGNAL DECRYPTING APPARATUS

BACKGROUND OF THE INVENTION

1. Field of the Invention

This invention relates to an information-signal encrypting apparatus and an information-signal decrypting apparatus. This invention also relates to a group of designated machines each provided with at least one of an information-signal encrypting apparatus and an information-signal decrypting apparatus which are designed to permit important contents information such as copyrighted contents information to be copied and reproduced by the designated machines, and to prevent the important contents information from being copied and reproduced by machines other than the designated ones.

2. Description of the Related Art

It is known to encrypt copyrighted contents information and then record the encryption-resultant information on a recording medium. A duplicate of the recording medium also stores the encryption-resultant information. The encryption-resultant information can be read out from the duplicate. A third party that does not know a key for decrypting the encryption-resultant information can not recover the original copyrighted contents information from the read-out encryption-resultant information. Therefore, it is possible to prevent the copyrighted contents information from being illegally copied.

Japanese patent application publication number 2002-169740 discloses a system including a contents server, an information reproducing terminal, and an IC card. In the system of Japanese patent application 2002-169740, electronic data representing encrypted contents is transmitted or downloaded from the contents server to the terminal via a network and an access point before being written into a memory within the terminal. When the IC card is inserted into the terminal, the contents server and the IC card can communicate with each other via the network, the access point, and the terminal. During the communication, a key for the encrypted contents is sent from the contents server to the IC card before being written into a memory within the IC card. The terminal can be operated in a reproducing mode. When the terminal is operated in the reproducing mode, the IC card is inserted in the terminal. During the reproducing mode of operation of the terminal, the key for the encrypted contents is fed from the IC card to the terminal, and the terminal decrypts the electronic data in response to the key to recover the original contents.

In the system of Japanese patent application 2002-169740, a certification key (an authentication key) is prestored in a memory within the IC card. Before the download of the electronic data from the contents server to the terminal is started, the server and the IC card communicate to confirm whether a user is legitimate on the basis of the certification key. After it is confirmed that the user is legitimate, the download of the electronic data from the contents server to the terminal is started. In addition, the transmission of the key for the encrypted contents from the contents server to the IC card is implemented. There is a possibility that the key for the encrypted contents will be eavesdropped on during the transmission thereof.

Typical DVD (digital versatile disc) recorder/players called typical DVD machines have functions of encrypting contents information and then recording the encryption-resultant information on DVD's. The DVD recorder/players also have functions of reading out encryption-resultant information from DVD's and then decrypting the read-out information to recover original contents information. The DVD recorder/players are compatible with each other in recording and reproducing features. In addition, the DVD recorder/players have common encrypting and decrypting functions. Therefore, one DVD machine can reproduce contents information from encryption-resultant information generated by another DVD machine. Thus, in the case where two different homes have DVD machines respectively, it is difficult to limit an area, in which the copying of contents information is permitted, to only one of the two homes.

Similarly, D-VHS recorder/players (D-VHS machines) have functions of encrypting contents information and then recording the encryption-resultant information on magnetic tapes. The D-VHS recorder/players also have functions of reading out encryption-resultant information from magnetic tapes and then decrypting the read-out information to recover original contents information. The D-VHS recorder/players are compatible with each other in recording and reproducing features. In addition, the D-VHS recorder/players have common encrypting and decrypting functions. Therefore, one D-VHS machine can reproduce contents information from encryption-resultant information generated by another D-VHS machine. Thus, in the case where two different homes have D-VHS machines respectively, it is difficult to limit an area, in which the copying of contents information is permitted, to only one of the two homes.

In general, the encryption of contents information uses an encryption key. In this case, the contents information can be recovered from the encryption-resultant information by referring to the encryption key.

In the case where both encryption-resultant information and an encryption key which has been used to encrypt contents information into the encryption-resultant information are recorded on a single recording medium, a third party can easily obtain both the encryption-resultant information and the encryption key by accessing the recording medium. Thus, the third party can easily reproduce the contents information from the encryption-resultant information by referring to the encryption key. To remove such a problem, the contents information is further subjected to encryption for an interface.

SUMMARY OF THE INVENTION

It is a first object of this invention to provide an information-signal encrypting apparatus and an information-signal decrypting apparatus designed to limit an area, in which the copying of an information signal such as a copyrighted contents signal is permitted, to only one home.

It is a second object of this invention to provide an information-signal encrypting apparatus and an information-signal decrypting apparatus which enable an encrypted information signal to be safely transmitted.

A first aspect of this invention provides an apparatus for encrypting an information signal into an encryption-resultant signal. The apparatus comprises first means for generating a first encryption key peculiar to the present apparatus; second means for reading key information from a replaceable recording medium; third means for deciding whether or not the key information read by the second means has been generated by an apparatus different from the present apparatus; fourth means for generating a second encryption key in response to the key information read by the second means when the third means decides that the key information has been generated by an apparatus different from the present apparatus; fifth means for selecting one from the first encryption key generated by the first means and the second encryption key generated by the fourth means as a final encryption key; and sixth means for encrypting an information signal in response to the final encryption key selected by the fifth means.

A second aspect of this invention is based on the first aspect thereof, and provides an apparatus wherein the fifth means comprises means for selecting the second encryption key as the final encryption key when the fourth means generates the second encryption key.

A third aspect of this invention is based on the first aspect thereof, and provides an apparatus further comprising seventh means for reading a flag from the recording medium; eighth means for deciding whether or not the flag read by the seventh means is in a prescribed state; and ninth means for writing encryption-key-generating information for generation of the first encryption key into the recording medium when the eighth means decides that the flag is in the prescribed state; wherein the second means comprises means for reading the encryption-key-generating information from the recording medium as the key information.

A fourth aspect of this invention provides an apparatus for decrypting an encryption-resultant information signal. The apparatus comprises first means for generating a first encryption key peculiar to the present apparatus; second means for reading key information from a replaceable recording medium; third means for deciding whether or not the key information read by the second means is generated by an apparatus different from the present apparatus; fourth means for generating a second encryption key in response to the key information read by the second means when the third means decides that the key information is generated by an apparatus different from the present apparatus; fifth means for selecting one from the first encryption key generated by the first means and the second encryption key generated by the fourth means as a final encryption key; and sixth means for decrypting an encryption-resultant information signal in response to the final encryption key selected by the fifth means to recover an original information signal.

A fifth aspect of this invention provides an encrypting/decrypting apparatus which can operate in either a first mode or a second mode. The apparatus comprises first means for implementing one of encryption and decryption of an information signal in response to a first encryption key during the first mode of operation; second means for implementing one of encryption and decryption of an information signal in response to a second encryption key during the second mode of operation; third means for generating the first encryption key; fourth means for using the first encryption key as a master key during the first mode of operation; fifth means for recording master key information for generation of the master key on a replaceable recording medium assigned to an apparatus different from the present apparatus during the first mode of operation; sixth means for reading master key information from a replaceable recording medium assigned to the present apparatus during the second mode of operation; and seventh means for generating the second encryption key in response to the master key information read by the sixth means during the second mode of operation.

A sixth aspect of this invention is based on the fifth aspect thereof, and provides an encrypting apparatus wherein the seventh means comprises means for generating second key information in response to the master key information read by the sixth means and ID information peculiar to the present apparatus; a memory; means for storing the second key information into the memory; and means for generating the master key being the second encryption key in response to the second key information and the ID information peculiar to the present apparatus.

A seventh aspect of this invention provides an apparatus comprising first means for generating an individual encryption key peculiar to the present apparatus; second means for reading key information from a removable recording medium; third means for generating a master encryption key in response to the key information read by the second means; fourth means for selecting one from the individual encryption key generated by the first means and the master encryption key generated by the third means as a final encryption key; and fifth means for processing an information signal in response to the final encryption key selected by the fourth means.

An eighth aspect of this invention provides a system comprising a master machine; a slave machine; a removable recording medium; a first memory provided in the master machine for storing a master-key base information peculiar to the master machine; first means for writing the master-key base information into the removable recording medium from the first memory; a second memory provided in the slave machine for storing a slave-key base information peculiar to the slave machine; second means provided in the slave machine for generating a first encryption key in response to the slave-key base information stored in the second memory; third means for reading the master-key base information from the removable recording medium; fourth means provided in the slave machine for generating a second encryption key in response to the master-key base information read by the third means; fifth means provided in the slave machine for selecting one from the first encryption key generated by the second means and the second encryption key generated by the fourth means as a final encryption key; and sixth means provided in the slave machine for processing an information signal in response to the final encryption key selected by the fifth means.

A ninth aspect of this invention is based on the first aspect thereof, and provides an apparatus further comprising a digital IO interface; seventh means for reading a machine ID signal from the replaceable recording medium; eighth means for deciding whether or not the replaceable recording medium is assigned to an apparatus different from the present apparatus; ninth means for identifying an apparatus having a machine ID signal identical with the machine ID signal read by the seventh means when the eighth means decides that the replaceable recording medium is assigned to an apparatus different from the present apparatus; tenth means provided in the first means for using key base information to generate the first encryption key; eleventh means for encrypting the key base information into encryption-resultant key base information in response to the key information read by the second means; and twelfth means for sending the encryption-resultant key base information generated by the eleventh means to the apparatus identified by the ninth means via the digital IO interface.

A tenth aspect of this invention provides an apparatus for encrypting an information signal into an encryption-resultant signal. The apparatus comprises first means for generating a first encryption key peculiar to the present apparatus; second means provided in the first means for using key base information to generate the first encryption key; a digital IO interface for receiving encryption-resultant key information; third means for decrypting the encryption-resultant key information received by the digital IO interface into decryption-resultant key information in response to the key base information; fourth means for generating a second encryption key in response to the decryption-resultant key information generated by the third means; fifth means for selecting one from the first encryption key generated by the first means and the second encryption key generated by the fourth means as a final encryption key; and sixth means for encrypting an information signal in response to the final encryption key selected by the fifth means.

An eleventh aspect of this invention provides an apparatus for decrypting an encryption-resultant information signal. The apparatus comprises first means for generating a first encryption key peculiar to the present apparatus; second means provided in the first means for using key base information to generate the first encryption key; a digital IO interface for receiving encryption-resultant key information; third means for decrypting the encryption-resultant key information received by the digital IO interface into decryption-resultant key information in response to the key base information; fourth means for generating a second encryption key in response to the decryption-resultant key information generated by the third means; fifth means for selecting one from the first encryption key generated by the first means and the second encryption key generated by the fourth means as a final encryption key; and sixth means for decrypting an encryption-resultant information signal in response to the final encryption key selected by the fifth means to recover an original information signal.

According to this invention, there is a plurality of machines in one home. The machines include an encrypting apparatus and a decrypting apparatus. The machines use recording mediums storing same second encryption key information, and hence hold a second encryption key in common. The second encryption key is a master key. The encrypting apparatus encrypts an information signal into an encryption-resultant signal in response to the master key, that is, the second encryption key. The decrypting apparatus decrypts the encryption-resultant signal into the original information signal in response to the master key, that is, the second encryption key.

Preferably, the master key is varied from home to home. In this case, a master key for machines in one home differs from those for machines in other homes. An information signal is encrypted into an encryption-resultant signal in response to the master key. While the encryption-resultant signal is recorded on an information storage medium, the master key is not recorded thereon. Accordingly, high security is provided.

According to this invention, a machine in a home transmits key information from a recording medium to a mobile device. It is unnecessary for the mobile device to have a reader for the recording medium. Thus, the mobile device can be small in size and light in weight. The machine encrypts an information signal into an encryption-resultant signal. The machine transmits the encryption-resultant signal to the mobile device. Accordingly, high security is provided.

DETAILED DESCRIPTION OF THE INVENTION

First Embodiment

Figure 1:
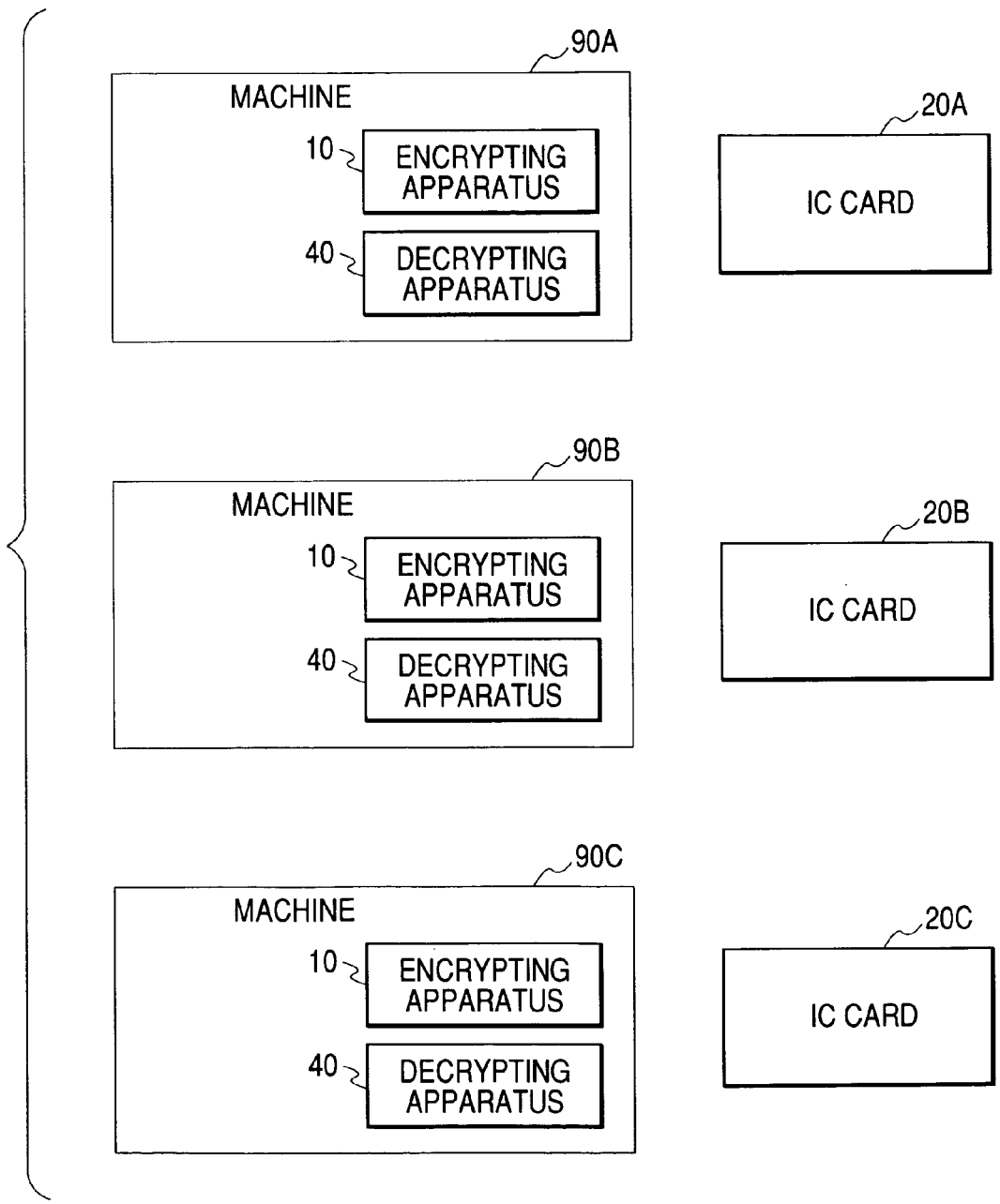
FIG. 1 is a diagram of machines and IC cards in one home according to a first embodiment of this invention.

With reference to FIG. 1, there are machines 90A, 90B, and 90C, and IC cards 20A, 20B, and 20C in one home. Basically, the IC cards 20A, 20B, and 20C are assigned to the machines 90A, 90B, and 90C, respectively. In other words, the IC cards 20A, 20B, and 20C correspond to the machines 90A, 90B, and 90C, respectively.

The body of the machine 90A has an opening for accommodating an IC card. When the IC card 20A is inserted into the opening in the body of the machine 90A, the IC card 20A and the machine 90A are connected. The IC card 20B or 20C can be inserted into the opening in the body of the machine 90A. When the IC card 20B or 20C is inserted into the opening in the body of the machine 90A, the IC card 20B or 20C and the machine 90A are connected. The body of the machine 90B has an opening for accommodating an IC card. When the IC card 20B is inserted into the opening in the body of the machine 90B, the IC card 20B and the machine 90B are connected. The IC card 20A or 20C can be inserted into the opening in the body of the machine 90B. When the IC card 20A or 20C is inserted into the opening in the body of the machine 90B, the IC card 20A or 20C and the machine 90B are connected. The body of the machine 90C has an opening for accommodating an IC card. When the IC card 20C is inserted into the opening in the body of the machine 90C, the IC card 20C and the machine 90C are connected. The IC card 20A or 20B can be inserted into the opening in the body of the machine 90C. When the IC card 20A or 20B is inserted into the opening in the body of the machine 90C, the IC card 20A or 20B and the machine 90C are connected.

The machines 90A, 90B, and 90C are ones selected from recorders, players, recorder/players, and transmitters. Each of the machines 90A, 90B, and 90C includes at least one of an encrypting apparatus 10 and a decrypting apparatus 40.

One among the machines 90A, 90B, and 90C which is currently accessed by a user is referred to as the present machine. Also, interested one among the machines 90A, 90B, and 90C is referred to as the present machine.

Each of the machines 90A, 90B, and 90C can be operated in one selected from different modes including a recording mode and a playback mode. Basically, the encrypting apparatus 10 in each of the machines 90A, 90B, and 90C is active during the recording mode of operation of the machine. The decrypting apparatus 40 in each of the machines 90A, 90B, and 90C is active during the playback mode of operation of the machine.

The IC cards 20A, 20B, and 20C store card ID signals peculiar to the IC cards 20A, 20B, and 20C, respectively. The card ID signals can not be altered. The machines 90A, 90B, and 90C store machine ID signals peculiar to the machines 90A, 90B, and 90C, respectively. The card ID signals in the IC cards 20A, 20B, and 20C are in a prescribed relation with the machine ID signals in the machines 90A, 90B, and 90C, respectively. The machines 90A, 90B, and 90C store encryption-key information pieces peculiar to the machines 90A, 90B, and 90C, respectively. The encryption-key information pieces in the machines 90A, 90B, and 90C are in a given relation with the machine ID signals in the machines 90A, 90B, and 90C, respectively.

Preferably, one of the machines 90A, 90B, and 90C is designated as a master machine while the others are designated as slave machines. The master machine generates a master encryption key from the machine ID signal and the encryption-key information piece stored therein. The master machine encrypts or decrypts an information signal in response to the master encryption key.

The IC card assigned to the master machine is referred to as the master card. The IC cards assigned to the slave machines are referred to as the slave cards. When each slave card is inserted into the opening in the body of the master machine, the master machine can write the machine ID signal and the encryption-key information piece for the master machine into the slave card. When each slave card loaded with the machine ID signal and the encryption-key information piece for the master machine is inserted into the opening in the body of the corresponding slave machine, the slave machine reads out the machine ID signal and the encryption-key information piece for the master machine from the slave card. The slave machine generates the master encryption key from the read-out machine ID signal and the read-out encryption-key information piece. The slave machine encrypts or decrypts an information signal in response to the master encryption key.

When a slave card which has not been loaded with the machine ID signal and the encryption-key information piece for the master machine yet is inserted into the opening in the body of the corresponding slave machine, the slave machine generates a slave encryption key from the machine ID signal and the encryption-key information piece stored therein. The slave machine encrypts or decrypts an information signal in response to the slave encryption key.

Figure 2:
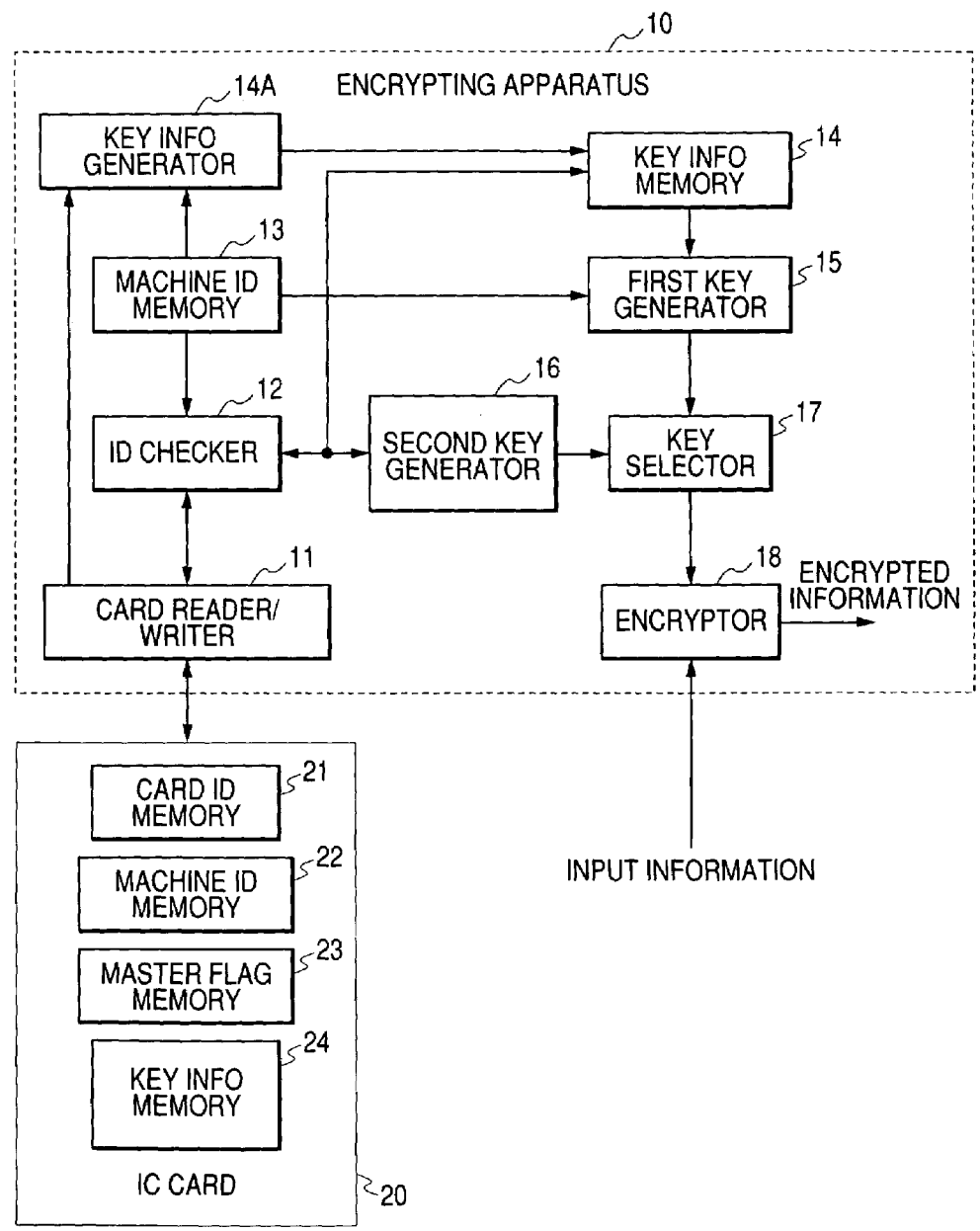
FIG. 2 is a block diagram of an encrypting apparatus and an IC card in FIG. 1.

As shown in FIG. 2, the encrypting apparatus 10 includes a card reader/writer 11, an ID checker 12, memories 13 and 14, an encryption key information generator 14A, a first encryption key generator 15, a second encryption key generator 16, a selector 17, and an encryptor 18.

When an IC card 20 (20A, 20B, or 20C) is inserted into the opening in the body of the present machine (90A, 90B, or 90C), the IC card 20 and the card reader/writer 11 in the encrypting apparatus 10 of the present machine are connected. The card reader/writer 11 is connected with the ID checker 12 and the encryption key information generator 14A. The ID checker 12 is connected with the memories 13 and 14, and the second encryption key generator 16. The memory 13 is connected with the encryption key information generator 14A and the first encryption key generator 15. The memory 14 is connected with the encryption key information generator 14A, the first encryption key generator 15, and the second encryption key generator 16. The first encryption key generator 15 is connected with the selector 17. The second encryption key generator 16 is connected with the selector 17. The selector 17 is connected with the encryptor 18. The encryptor 18 receives contents information (an information signal). The encryptor 18 is connected with a recording device in the present machine.

The memory 13 is previously loaded with a machine ID signal peculiar to the present machine. Alternatively, the memory 13 may be previously loaded with an information piece relating to the machine ID signal. The memory 14 is previously loaded with encryption key information peculiar to the present machine. In general, "encryption key information" means base information for generation of an encryption key which is called "encryption-key base information". The encryption key information in the memory 14 is in a given relation with the machine ID signal or the machine-ID-related information piece in the memory 13. Thus, the encryption key information in the memory 14 corresponds to the machine ID signal or the machine-ID-related information piece in the memory 13.

A first encryption key is generated in response to the encryption key information in the memory 14 and the machine ID signal or the machine-ID-related information piece in the memory 13. A second encryption key (a master key) is generated in response to encryption key information and a machine ID signal or a machine-ID-related information piece transferred from an IC card. The contents information is encrypted in response to the first or second encryption key. The encryption-resultant information is recorded on an information storage medium (for example, a removable information storage medium) located in the present machine.

When the IC card 20 is inserted into the opening in the body of the present machine, the IC card 20 and the card reader/writer 11 in the encrypting apparatus 10 of the present machine are connected. In this case, the card reader/writer 11 can read out signals or information pieces of various types from the IC card 20. Furthermore, the card reader/writer 11 can write signals or information pieces such as a machine ID signal and encryption key information into the IC card 20.

In the encrypting apparatus 10, the first encryption key generator 15 produces a first encryption key from the machine ID signal or the machine-ID-related information piece and the encryption key information outputted by the memories 13 and 14. The first encryption key generator 15 feeds the first encryption key to the selector 17. The second encryption key generator 16 produces a second encryption key (a master key) from a machine ID signal or a machine-ID-related information piece and encryption key information read out from the currently-connected IC card 20. The second encryption key normally differs from the first encryption key. The second encryption key generator 16 feeds the second encryption key to the selector 17. The selector 17 chooses one from the first and second encryption keys, and passes the chosen encryption key to the encryptor 18 as a final encryption key. The device 18 encrypts the contents information in response to the final encryption key to get the encryption-resultant information. The encryptor 18 outputs the encryption-resultant information to the recording device. The recording device records the encryption-resultant information on the information storage medium in the present machine.

The IC card 20 includes memories 21, 22, 23, and 24. The memory 21 is previously loaded with a card ID signal peculiar to the IC card 20. The card ID signal in the IC card 20 is in a prescribed relation with the machine ID signal in the machine corresponding to the IC card. The card ID signal can not be updated. The memory 22 is assigned to a machine ID signal for a master machine. Alternatively, the memory 22 may be assigned to an information piece relating to the machine ID signal for the master machine. The memory 23 is assigned to a master flag. The memory 24 is assigned to encryption key information for the master machine.

The card ID signal in the memory 21 of the IC card 20 is preset to a logic-value state having a prescribed one-to-one correspondence functional relation with the machine ID signal peculiar to the machine corresponding to the IC card 20. The card ID signal in the memory 21 of the IC card 20 may be preset to a logic-value state having the prescribed one-to-one correspondence functional relation with the information piece relating to the machine ID signal peculiar to the machine corresponding to the IC card 20.

When the IC card 20 and the card reader/writer 11 are connected, the card reader/writer 11 reads out the card ID signal from the memory 21 within the IC card 20. The encrypting apparatus 10 compares the read-out card ID signal with the machine ID signal or the machine-ID-related information piece in the memory 13, and decides whether the IC card 20 corresponds to the present machine or another machine on the basis of the result of the comparison.

Arbitrary one is chosen from the machines 90A, 90B, and 90C as a master machine in accordance with user's request. Specifically, a user inserts a corresponding IC card 20 into the opening in the body of a machine to be chosen as a master. Then, the user operates a user interface of the machine to designate the machine as a master. In response to the operation of the user interface, the encrypting apparatus 10 in the machine acts as follows. First, a machine ID signal or a machine-ID-related information piece is sent from the memory 13 to the card reader/writer 11 through the ID checker 12 while encryption key information is sent from the memory 14 to the card reader/writer 11 through the ID checker 12. Thus, the card reader/writer 11 receives the machine ID signal or the machine-ID-related information piece and the encryption key information from the memories 13 and 14. The card reader/writer 11 writes the received machine ID signal or the received machine-ID-related information piece into the memory 22 within the IC card 20. Furthermore, the card reader/writer 11 writes the received encryption key information into the memory 24 within the IC card 20. In this way, the master machine (or the encrypting apparatus 10 in the master machine) is permitted to write the machine ID signal or the machine-ID-related information piece, and the encryption key information into an IC card 20 connected with the master machine.

When one is chosen from the machines 90A, 90B, and 90C as a master machine, the others are designated as slave machines in accordance with user's operation of the user interfaces thereof. Each slave machine is inhibited from writing a machine ID signal or a machine-ID-related information piece, and encryption key information into an IC card 20 (20A, 20B, or 20C) connected with the slave machine. Therefore, in the case where both a card ID signal in the memory 21 within an IC card 20 and a machine ID signal or a machine-ID-related information piece in the memory 22 within the IC card 20 correspond to a same machine, encryption key information in the memory 24 within the IC card 20 is identical with that in the master machine.

The encrypting apparatus 10 in each of the machines 90A, 90B, and 90C may be provided with a memory for a master flag. In this case, when a machine (90A, 90B, or 90C) writes a machine ID signal or a machine-ID-related information piece and encryption key information into an IC card 20 connected with the machine, the machine updates a master flag in the internal memory to a state indicating that the machine is a master. Accordingly, by checking the state of a master flag in the memory within a machine, it is possible to decide whether or not the machine is a master.

An IC card 20 assigned to a master machine is called a master IC card 20. An IC card 20 assigned to a slave machine is called a slave IC card 20. When a slave IC card 20 is inserted into the opening in the body of a master machine, the slave IC card 20 and the master machine are connected. In this case, the encrypting apparatus 10 in the master machine writes a machine ID signal or a machine-ID-related information piece, and encryption key information for the master machine into the slave IC card 20. The machine ID signal or the machine-ID-related information piece, and the encryption key information written into the slave IC card 20 are peculiar to the master machine. Then, the slave IC card 20 is ejected from the master machine, and is inserted into the opening in the body of a slave machine. The slave machine reads out the machine ID signal or the machine-ID-related information piece, and the encryption key information for the master machine from the slave IC card 20. The slave machine generates a final encryption key in response to the read-out machine ID signal or the read-out machine-ID-related information piece, and the read-out encryption key information for the master machine. The final encryption key generated in the slave machine is identical with that in the master machine. The slave machine encrypts contents information in response to the generated final encryption key to get encryption-resultant information. The slave machine records the encryption-resultant information on an information storage medium of, for example, a removable type.

When the slave IC card 20 and the master machine are connected, the card reader/writer 11 in the encrypting apparatus 10 of the master machine reads out a card ID signal from the memory 21 within the slave IC card 20. The encrypting apparatus 10 in the master machine compares the read-out card ID signal with a machine ID signal or a machine-ID-related information piece in the memory 13, and decides whether or not the currently-connected IC card 20 corresponds to the master machine on the basis of the result of the comparison. Since the card ID signal in the slave IC card 20 is out of the prescribed relation with the machine ID signal or the machine-ID-related information piece in the encrypting apparatus 10 of the master machine, the encrypting apparatus 10 of the master machine decides that the currently-connected IC card 20 does not correspond to the master machine. In this case, the encrypting apparatus 10 of the master machine also decides that encryption key information in the IC card 20 is peculiar to a machine different from the master machine.

When the slave IC card 20 which has been loaded with the machine ID signal or the machine-ID-related information piece and the encryption key information for the master machine is inserted into the opening in the body of a slave machine, the slave IC card 20 and the slave machine are connected. In this case, the card reader/writer 11 in the encrypting apparatus 10 of the slave machine reads out the card ID signal from the memory 21 within the slave IC card 20. The encrypting apparatus 10 in the slave machine compares the read-out card ID signal with a machine ID signal or an machine-ID-related information piece in the memory 13, and decides whether or not the currently-connected IC card 20 corresponds to the slave machine on the basis of the result of the comparison. Since the card ID signal in the slave IC card 20 is in the prescribed relation with the machine ID signal or the machine-ID-related information piece in the encrypting apparatus 10 of the slave machine, the encrypting apparatus 10 of the slave machine decides that the currently-connected IC card 20 corresponds to the slave machine. Then, the slave machine reads out the machine ID signal or the machine-ID-related information piece and the encryption key information for the master machine from the slave IC card 20. The slave machine generates a final encryption key in response to the read-out machine ID signal or the read-out machine-ID-related information piece and the read-out encryption key information for the master machine. The final encryption key generated in the slave machine is identical with that in the master machine. The slave machine encrypts contents information in response to the generated final encryption key to get encryption-resultant information. The slave machine records the encryption-resultant information on an information storage medium of, for example, a removable type.

Each of the machines 90A, 90B, and 90C can be designated as either a master machine or a slave machine in accordance with user's request.

The encrypting apparatus 10 in FIG. 2 operates as follows. When an IC card 20 is inserted into the opening in the body of the present machine, the IC card 20 and the card reader/writer 11 in the encrypting apparatus 10 of the present machine are connected. In this case, the card reader/writer 11 reads out a card ID signal from the memory 21 within the IC card 20. In addition, the card reader/writer 11 reads out a machine ID signal or a machine-ID-related information piece from the memory 22 within the IC card 20. Furthermore, the card reader/writer 11 reads out encryption key information from the memory 24 within the IC card 20. The read-out machine ID signal or the read-out machine-ID-related information piece corresponds to a master machine. Also, the read-out encryption key information corresponds to the master machine. The card reader/writer 11 passes the read-out card ID signal to the ID checker 12. A machine ID signal or a machine-ID-related information piece is sent from the memory 13 to the ID checker 12.

The ID checker 12 decides whether or not the card ID signal and the machine ID signal or the machine-ID-related information piece are in the prescribed relation. When the card ID signal and the machine ID signal or the machine-ID-related information piece are in the prescribed relation, the ID checker 12 concludes that the currently-connected IC card 20 corresponds to the present machine. On the other hand, when the card ID signal and the machine ID signal or the machine-ID-related information piece are not in the prescribed relation, the ID checker 12 concludes that the currently-connected IC card 20 corresponds to a machine different from the present machine. The ID checker 12 notifies the result of the decision, that is, the result of the conclusion, to the card reader/writer 11.

When the conclusion result notified from the ID checker 12 indicates that the currently-connected IC card 20 corresponds to the present machine, the card reader/writer 11 sends the read-out machine ID signal or the read-out machine-ID-related information piece and the read-out encryption key information to the second encryption key generator 16 through the ID checker 12. As previously mentioned, the read-out machine ID signal or the read-out machine-ID-related information piece corresponds to a master machine. Also, the read-out encryption key information corresponds to the master machine.

When the conclusion result notified from the ID checker 12 indicates that the currently-connected IC card 20 does not correspond to the present machine, the card reader/writer 11 does not send the read-out machine ID signal or the read-out machine-ID-related information piece and the read-out encryption key information for the master machine to the second encryption key generator 16.

The card reader/writer 11 passes the read-out card ID signal and the read-out machine ID signal or the read-out machine-ID-related information piece to the ID checker 12. The ID checker 12 also decides whether or not the read-out card ID signal and the read-out machine ID signal or the read-out machine-ID-related information piece are in the prescribed relation. When the read-out card ID signal and the read-out machine ID signal or the read-out machine-ID-related information piece are in the prescribed relation, the ID checker 12 concludes that the currently-connected IC card 20 corresponds to the master machine. On the other hand, when the read-out card ID signal and the read-out machine ID signal or the read-out machine-ID-related information piece are not in the prescribed relation, the ID checker 12 concludes that the currently-connected IC card 20 corresponds to a machine different from the master machine.

As previously mentioned, the memory 14 stores encryption key information peculiar to the present machine. The memory 14 feeds the encryption key information to the first encryption key generator 15. As previously mentioned, the memory 13 stores a machine ID signal peculiar to the present machine or an information piece relating to the machine ID signal. The memory 13 feeds the machine ID signal or the machine-ID-related information piece to the first encryption key generator 15. The device 15 generates a first encryption key in response to the encryption key information and the machine ID signal or the machine-ID-related information piece fed from the memories 13 and 14. The first encryption key generator 15 outputs the first encryption key to the selector 17.

In the case where the second encryption key generator 16 receives the read-out machine ID signal or the read-out machine-ID-related information piece and the read-out encryption key information for the master machine from the card reader/writer 11, the device 16 generates a second encryption key in response to the received machine ID signal or the received machine-ID-related information piece and the received encryption key information. The second encryption key is identical with a final encryption key used in the master machine. The second encryption key generator 16 outputs the second encryption key to the selector 17.

The selector 17 responds to user's operation of the user interface in the present machine. When the present machine is operated as a slave machine in accordance with user's request, the selector 17 normally chooses the second encryption key as a final encryption key. In this case, the selector 17 passes the final encryption key, that is, the second encryption key, to the encryptor 18. The device 18 encrypts contents information in response to the final encryption key (the second encryption key) to get encryption-resultant information. Since the final encryption key (the second encryption key) is identical with that in the master machine, the encryption of the contents information by the encryptor 18 is the same as that implemented in the master machine. The encryptor 18 outputs the encryption-resultant information to the recording device in the present machine.

There is an empty IC card 20 in which the memory 22 stores neither a machine ID signal nor a machine-ID-related information piece, and the memory 24 stores no encryption key information. When such an empty IC card 20 is inserted into the opening in the body of the present machine which is operated as a slave machine, the empty IC card 20 and the card reader/writer 11 in the encrypting apparatus 10 of the present machine are connected. In this case, the card reader/writer 11 can not read out a machine ID signal or a machine-ID-related information piece from the memory 22 within the currently-connected IC card 20. The card reader/writer 11 notifies the selector 17 that neither a machine ID signal nor a machine-ID-related information piece can be read out from the currently-connected IC card 20. In accordance with the notification from the card reader/writer 11, the selector 17 chooses the first encryption key as a final encryption key. In this case, the selector 17 passes the final encryption key, that is, the first encryption key, to the encryptor 18. The device 18 encrypts contents information in response to the final encryption key (the first encryption key) to get encryption-resultant information. The encryptor 18 outputs the encryption-resultant information to the recording device in the present machine.

On the other hand, when an IC card 20 corresponding to the present machine and storing a machine ID signal or a machine-ID-related information piece and encryption key information for the master machine is inserted into the opening in the body of the present machine which is operated as a slave machine, the selector 17 in the encrypting apparatus 10 of the present machine chooses the second encryption key as previously mentioned. In this case, the selector 17 passes the second encryption key to the encryptor 18. The device 18 encrypts contents information in response to the second encryption key to get encryption-resultant information. The encryptor 18 outputs the encryption-resultant information to the recording device in the present machine.

As previously mentioned, in the present machine which is operated as a slave machine, the device 18 encrypts contents information in response to the first encryption key or the second encryption key to get encryption-resultant information. The encryptor 18 outputs the encryption-resultant information to the recording device in the present machine. The recording device records the encryption-resultant information on an information storage medium of, for example, a removable type.

In this way, a slave machine receives a machine ID signal or a machine-ID-related information piece and encryption key information from a master machine via an IC card assigned to the slave machine. The slave machine uses the received machine ID signal or the received machine-ID-related information piece and the received encryption key information for the master machine to generate a final encryption key (a second encryption key). The generated final encryption key is identical with that used in the master machine. Thus, the slave machine and the master machine can hold an encryption key in common. The slave machine encrypts contents information in response to the common encryption key to get encryption-resultant information. The slave machine records the encryption-resultant information on an information storage medium of, for example, a removable type.

In the event that a master machine in a home goes wrong, encryption key information for the master machine can be transferred to a machine in the same home which differs from the master machine while the machine can be designated as a new master machine. The transfer of the encryption key information for the master machine, and the designation of the new master machine are implemented as follows.

When an IC card 20 corresponding to a master machine (that is, a master card) is inserted into the opening in the body of a slave machine, the IC card 20 and the card reader/writer 11 in the encrypting apparatus 10 of the slave machine are connected. In this case, the card reader/writer 11 reads out a card ID signal from the memory 21 within the IC card 20. In addition, the card reader/writer 11 reads out a machine ID signal or an information piece relating to the machine ID signal from the memory 22 within the IC card 20. Furthermore, the card reader/writer 11 reads out encryption key information from the memory 24 within the IC card 20. In addition, the card reader/writer 11 reads out a master flag from the memory 23 within the IC card 20. The read-out machine ID signal or the read-out machine-ID-related information piece corresponds to the master machine. Also, the read-out encryption key information corresponds to the master machine. The card reader/writer 11 passes the read-out card ID signal and the read-out machine ID signal or the read-out machine-ID-related information piece to the ID checker 12. The ID checker 12 decides whether or not the read-out card ID signal and the read-out machine ID signal or the read-out machine-ID-related information piece are in the prescribed relation. Since both the read-out card ID signal and the read-out machine ID signal or the read-out machine-ID-related information piece correspond to the master machine, they are in the prescribed relation. When the read-out card ID signal and the read-out machine ID signal or the read-out machine-ID-related information piece are in the prescribed relation, the ID checker 12 concludes that the currently-connected IC card 20 corresponds to the master machine.

After the ID checker 12 concludes that the currently-connected IC card 20 corresponds to the master machine, the slave machine operates as follows. In accordance with prescribed user's operation of the user interface of the slave machine, the card reader/writer 11 decides whether, the read-out master flag is "0" (an initial value) or "1". Alternatively, the ID checker 12 may decide whether the read-out master flag is "0" or "1". Provided that the read-out master flag is "0", the card reader/writer 11 passes the read-out machine ID signal or the read-out machine-ID-related information piece and the read-out encryption key information to the encryption key information generator 14A. The memory 13 outputs a machine ID signal or a machine-ID-related information piece to the encryption key information generator 14A. The encryption key information generator 14A produces new encryption key information from the read-out encryption key information, the read-out machine ID signal or the read-out machine-ID-related information piece, and the machine ID signal or the machine-ID-related information piece outputted by the memory 13. The encryption key information generator 14A writes the new encryption key information into the memory 14 on an overwriting basis.

It should be noted that the read-out encryption key information may be sent from the card reader/writer 11 to the memory 14 through the ID checker 12 before being written into the memory 14 as new encryption key information.

An encryption key identical with that in the master machine can be generated from the new encryption key information and the machine ID signal or the machine-ID-related information piece in the memory 13. In the case where the user interface of the slave machine is operated by the user to designate the slave machine as a new master machine, the machine ID signal or the machine-ID-related information piece is sent from the memory 13 to the card reader/writer 11 through the ID checker 12 while the encryption key information (the new encryption key information) is sent from the memory 14 to the card reader/writer 11 through the ID checker 12. Thus, the card reader/writer 11 receives the machine ID signal or the machine-ID-related information piece and the encryption key information from the memories 13 and 14. The card reader/writer 11 writes the received machine ID signal or the received machine-ID-related information piece into the memory 22 within the IC card 20 on an overwriting basis. Furthermore, the card reader/writer 11 writes the received encryption key information into the memory 24 within the IC card 20 on an overwriting basis.

When the encryption key information is transferred from the memory 24 within the IC card 20 to the memory 14 within the slave apparatus as at least a part of the new encryption key information, the card reader/writer 11 accesses the memory 23 within the IC card 20 and changes a master flag in the memory 23 from "0" (an initial value) to "1". The master flag being "1" forms master key transfer history information which inhibits the IC card 20 from being used as a master card. The master flag being "1" prevents the transfer of the machine ID signal or the machine-ID-related information piece and the encryption key information from the memories 22 and 24 within the IC card 20 to a machine.

In this way, after encryption key information is transferred from a master card to a slave machine to be designated as a new master machine, the state of a master flag in the master card is changed so that the master card function (the encryption-key-information giving function) will be removed therefrom. Accordingly, there can be only one master card and one master machine.

As previously mentioned, the first encryption key is generated from the encryption key information in the memory 14 and the machine ID signal or the machine-ID-related information piece in the memory 13. The second encryption key is generated from the encryption key information and the machine ID signal or the machine-ID-related information piece transferred from the currently-connected IC card 20. One is selected from the first and second encryption keys as a final encryption key employed to encrypt the contents information. The use of the machine ID signal or the machine-ID-related information piece for the generation of the first encryption key or the second encryption key makes it difficult to derive the first encryption key or the second encryption key from only the encryption key information. Accordingly, high security is provided.

Figure 3:
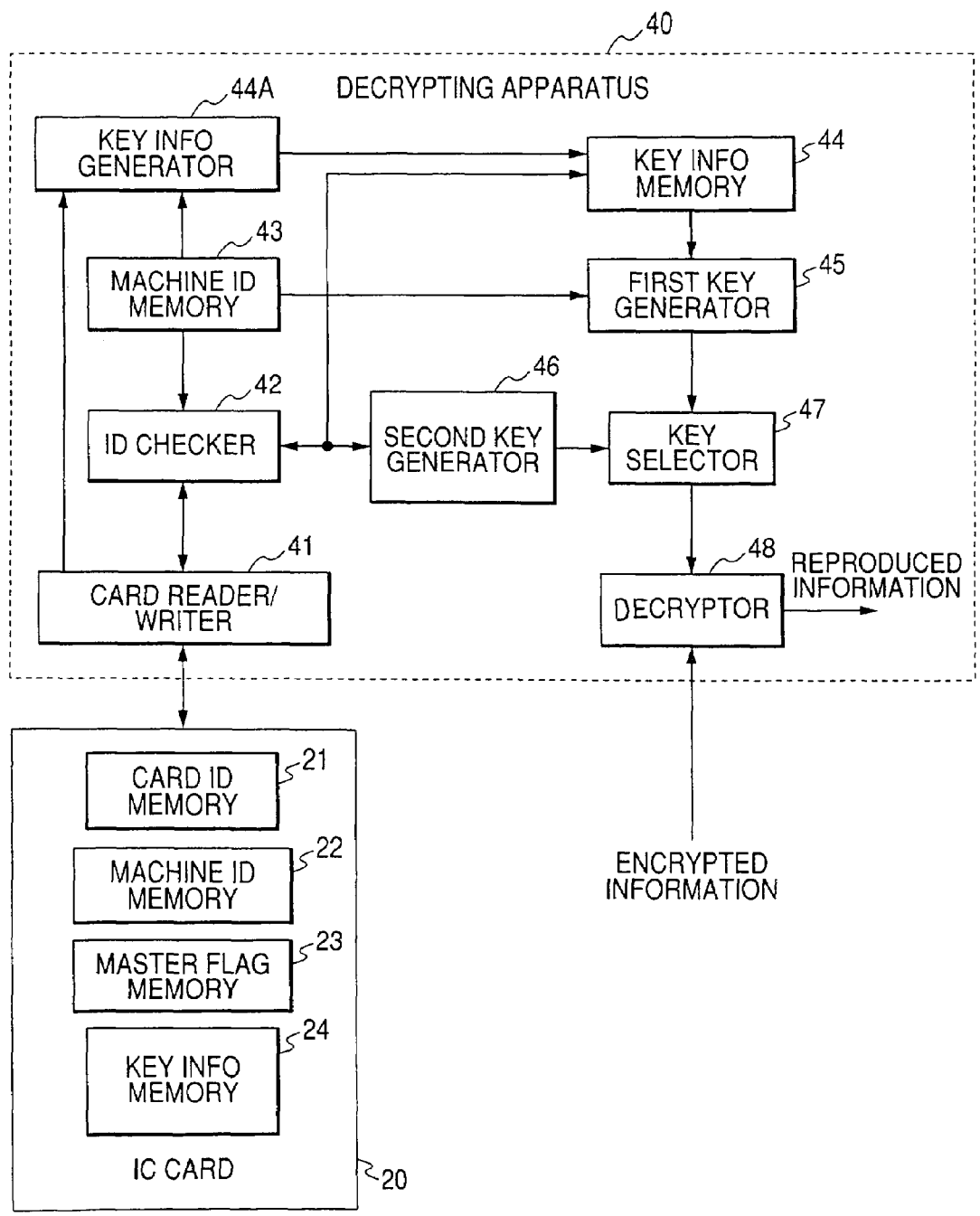
FIG. 3 is a block diagram of a decrypting apparatus and an IC card in FIG. 1.

As shown in FIG. 3, the decrypting apparatus 40 includes a card reader/writer 41, an ID checker 42, memories 43 and 44, an encryption key information generator 44A, a first encryption key generator 45, a second encryption key generator 46, a selector 47, and a decryptor 48.

When an IC card 20 (20A, 20B, or 20C) is inserted into the opening in the body of the present machine (90A, 90B, or 90C), the IC card 20 and the card reader/writer 41 in the decrypting apparatus 40 of the present machine are connected. The card reader/writer 41 is connected with the ID checker 42 and the encryption key information generator 44A. The ID checker 42 is connected with the memories 43 and 44, and the second encryption key generator 46. The memory 43 is connected with the encryption key information generator 44A and the first encryption key generator 45. The memory 44 is connected with the encryption key information generator 44A, the first encryption key generator 45, and the second encryption key generator 46. The first encryption key generator 45 is connected with the selector 47. The second encryption key generator 46 is connected with the selector 47. The selector 47 is connected with the decryptor 48. The decryptor 48 is connected with a reproducing device in the present machine. The decryptor 48 receives reproduced encryption-resultant information (an encryption-resultant information signal) from the reproducing device.

The memory 43 is previously loaded with a machine ID signal peculiar to the present machine. Alternatively, the memory 43 may be previously loaded with an information piece relating to the machine ID signal. The memory 44 is previously loaded with encryption key information peculiar to the present machine. The encryption key information in the memory 44 is in a given relation with the machine ID signal or the machine-ID-related information piece in the memory 43. Thus, the encryption key information in the memory 44 corresponds to the machine ID signal or the machine-ID-related information piece in the memory 43.

A first encryption key is generated in response to the encryption key information in the memory 44 and the machine ID signal or the machine-ID-related information piece in the memory 43. A second encryption key is generated in response to encryption key information and a machine ID signal or a machine-ID-related information piece transferred from an IC card. The reproduced encryption-resultant information is decrypted in response to the first or second encryption key to recover original contents information.

The decrypting apparatus 40 in a slave machine can receive a machine ID signal or a machine-ID-related information piece and encryption key information from a master machine via an IC card 20 assigned to the slave machine. The decrypting apparatus 40 uses the received machine ID signal or the received machine-ID-related information piece and the received encryption key information for the master machine to generate a final encryption key identical with that employed by the master machine to produce encryption-resultant information. Accordingly, the decrypting apparatus 40 can correctly decrypt the encryption-resultant information produced by the master machine into the original contents information in response to the final encryption key.

When an IC card 20 is inserted into the opening in the body of the present machine, the IC card 20 and the card reader/writer 41 in the decrypting apparatus 40 of the present machine are connected. In this case, the card reader/writer 41 can read out signals or information pieces of various types from the IC card 20. For example, the card reader/writer 41 reads out a card ID signal and a machine ID signal or a machine-ID-related information piece from the memories 21 and 22 within the IC card 20. Furthermore, the card reader/writer 41 reads out encryption key information from the memory 24 within the IC card 20. When the IC card 20 is assigned to the present machine, the read-out card ID signal is in a prescribed relation with the machine ID signal or the machine-ID-related information piece in the memory 43 within the present machine.

In the decrypting apparatus 40, the first encryption key generator 45 produces a first encryption key from the machine ID signal or the machine-ID-related information piece and the encryption key information outputted by the memories 43 and 44. The first encryption key generator 45 feeds the first encryption key to the selector 47. The second encryption key generator 46 produces a second encryption key (a master key) in response to a machine ID signal or a machine-ID-related information piece and encryption key information read out from an IC card 20. The second encryption key normally differs from the first encryption key. The second encryption key generator 46 feeds the second encryption key to the selector 47. The selector 47 chooses one from the first and second encryption keys, and passes the chosen encryption key to the decryptor 48 as a final encryption key (a final decryption key). The device 48 decrypts the reproduced encryption-resultant information in response to the final encryption key (the final decryption key) to recover the original contents information. The decryptor 48 outputs the recovered original contents information to a suitable device such as a display.

When the IC card 20 and the card reader/writer 41 are connected, the card reader/writer 41 reads out the card ID signal from the memory 21 within the IC card 20. In addition, the card reader/writer 41 reads out the machine ID signal or the machine-ID-related information piece from the memory 22 within the IC card 20. Furthermore, the card reader/writer 41 reads out the encryption key information from the memory 24 within the IC card 20. Normally, the read-out machine ID signal or the read-out machine-ID-related information piece and the read-out encryption key information are those for the master machine. The decrypting apparatus 40 compares the read-out card ID signal with the machine ID signal or the machine-ID-related information piece in the memory 13, and decides whether the IC card 20 corresponds to the present machine or another machine on the basis of the result of the comparison. When the IC card 20 corresponds to the present machine, the card reader/writer 41 sends the read-out machine ID signal or the read-out machine-ID-related information piece and the read-out encryption key information for the master machine to the second encryption key generator 46 through the ID checker 42. The second encryption key generator 46 produces a second encryption key (a master key) from the incoming machine ID signal or the incoming machine-ID-related information piece and the incoming encryption key information for the master machine. The produced second encryption key is identical with the final encryption key used by the master machine to encrypt the contents information. The second encryption key generator 46 feeds the second encryption key to the selector 47. The selector 47 passes the second encryption key to the decryptor 48 as a final encryption key (a final decryption key). The device 48 decrypts the reproduced encryption-resultant information in response to the final encryption key (the final decryption key or the second encryption key) to recover the original contents information. The decryptor 48 outputs the recovered original contents information to the suitable device (the display).

There is an empty IC card 20 in which the memory 22 stores neither a machine ID signal nor a machine-ID-related information piece, and the memory 24 stores no encryption key information. When such an empty IC card 20 is inserted into the opening in the body of the present machine which is operated as a slave machine, the empty IC card 20 and the card reader/writer 41 in the decrypting apparatus 40 of the present machine are connected. In this case, the card reader/writer 41 can not read out a machine ID signal or a machine-ID-related information piece from the memory 22 within the currently-connected IC card 20. The card reader/writer 41 notifies the selector 47 that neither a machine ID signal nor a machine-ID-related information piece can be read out from the currently-connected IC card 20. The memory 43 feeds the first encryption key generator 45 with the machine ID signal peculiar to the present machine or the information piece relating to the machine ID signal. The memory 44 feeds the first encryption key generator 45 with the encryption key information peculiar to the present machine. The first encryption key generator 45 produces the first encryption key in response to the machine ID signal or the machine-ID-related information piece fed from the memory 43 and the encryption key information fed from the memory 44. The first encryption key generator 45 feeds the first encryption key to the selector 47. In accordance with the notification from the card reader/writer 41, the selector 47 chooses the first encryption key as a final encryption key (a final decryption key). The selector 47 outputs the final encryption key to the decryptor 48. The device 48 decrypts the reproduced encryption-resultant information in response to the final encryption key (the final decryption key or the first encryption key) to recover the original contents information. The decryptor 48 outputs the recovered original contents information to the suitable device (the display).

When an IC card 20 corresponding to a master machine (that is, a master card) is inserted into the opening in the body of the present machine, the master card 20 and the card reader/writer 41 in the decrypting apparatus 40 of the present machine are connected. In this case, the card reader/writer 41 reads out a card ID signal from the memory 21 within the master card 20. In addition, the card reader/writer 41 reads out a machine ID signal or an information piece relating to the machine ID signal from the memory 22 within the master card 20. Furthermore, the card reader/writer 41 reads out encryption key information from the memory 24 within the master card 20. In addition, the card reader/writer 41 reads out a master flag from the memory 23 within the master card 20. The read-out machine ID signal or the read-out machine-ID-related information piece corresponds to the master machine. Also, the read-out encryption key information corresponds to the master machine. The card reader/writer 41 passes the read-out card ID signal and the read-out machine ID signal or the read-out machine-ID-related information piece to the ID checker 42. The ID checker 42 decides whether or not the read-out card ID signal and the read-out machine ID signal or the read-out machine-ID-related information piece are in the prescribed relation. Since both the read-out card ID signal and the read-out machine ID signal or the read-out machine-ID-related information piece correspond to the master machine, they are in the prescribed relation. When the read-out card ID signal and the read-out machine ID signal or the read-out machine-ID-related information piece are in the prescribed relation, the ID checker 42 concludes that the currently-connected IC card 20 corresponds to the master machine.

After the ID checker 42 concludes that the currently-connected IC card 20 corresponds to the master machine, the present machine operates as follows. In accordance with prescribed user's operation of the user interface of the present machine, the card reader/writer 41 decides whether the read-out master flag is "0" (an initial value) or "1". Alternatively, the ID checker 42 may decide whether the read-out master flag is "0" or "1". Provided that the read-out master flag is "0", the card reader/writer 41 passes the read-out machine ID signal or the read-out machine-ID-related information piece and the read-out encryption key information to the encryption key information generator 44A. The memory 43 outputs a machine ID signal or a machine-ID-related information piece to the encryption key information generator 44A. The encryption key information generator 44A produces new encryption key information from the read-out encryption key information, the read-out machine ID signal or the read-out machine-ID-related information piece, and the machine ID signal or the machine-ID-related information piece outputted by the memory 43. The encryption key information generator 44A writes the new encryption key information into the memory 44 on an overwriting basis.

It should be noted that the read-out encryption key information may be sent from the card reader/writer 41 to the memory 44 through the ID checker 42 before being written into the memory 44 as new encryption key information.

When the encryption key information is transferred from the memory 24 within the master card 20 to the memory 44 within the present machine as at least a part of the new encryption key information, the card reader/writer 41 accesses the memory 23 within the master card 20 and changes a master flag in the memory 23 from "0" (an initial value) to "1".

As understood from the above description, the second encryption key can be held in common by the machines (the machines) 90A, 90B, and 90C in one home. It is unnecessary to vary a key for encryption and decryption from machine to machine in one home. One is chosen from the machines 90A, 90B, and 90C as a master machine while the others are designated as slave machines. An information signal is encrypted into an encryption-resultant signal in response to an encryption key for the master machine. The encryption-resultant information is recorded on a removable information storage medium by the master machine. Each of the slave machines can reproduce the encryption-resultant information from the removable information storage medium. Since the encryption key for the master machine can be set to a common key in each of the slave machines, each of the slave machine can correctly decrypt the encryption-resultant information into the original information signal in response to the common key. Preferably, the common key for the machines 90A, 90B, and 90C in one home differs from those for machines in other homes. In this case, the encryption-resultant information generated by one of the machines 90A, 90B, and 90C in one home can not be correctly decrypted by machines in other homes.

Second Embodiment

Figure 4:
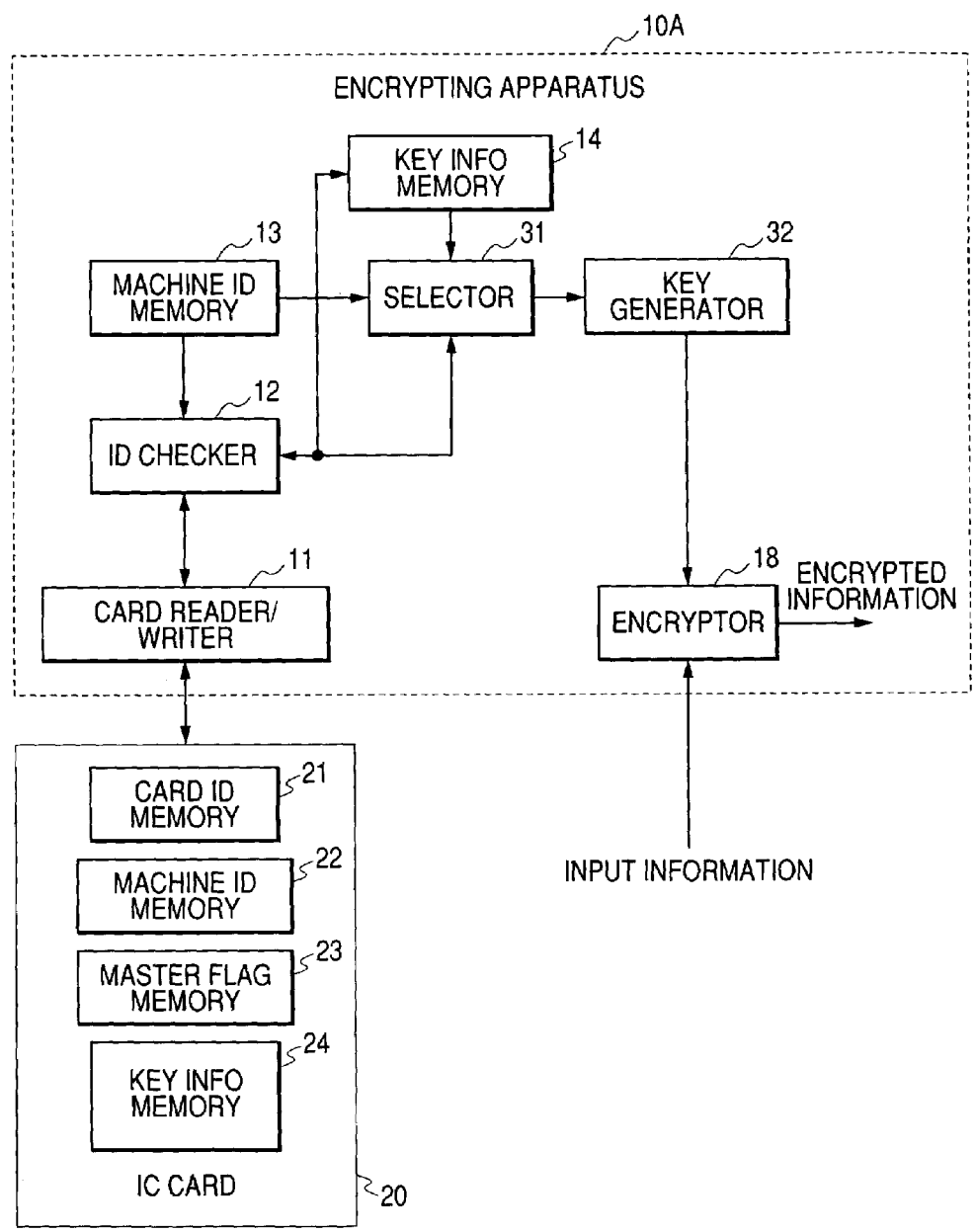
FIG. 4 is a block diagram of an encrypting apparatus and an IC card in a second embodiment of this invention.

FIG. 4 shows an encrypting apparatus 10A in a second embodiment of this invention which replaces the encrypting apparatus 10 in FIG. 2. The encrypting apparatus 10A in FIG. 4 is similar to the encrypting apparatus 10 in FIG. 2 except for design changes mentioned hereafter.

As shown in FIG. 4, the encrypting apparatus 10A includes a selector 31 and an encryption key generator 32. The selector 31 is connected among an ID checker 12, a memory 13, a memory 14, and the encryption key generator 32. The encryption key generator 32 is connected with an encryptor 18.

Generally, the encrypting apparatus 10A is provided in each of machines 90A, 90B, and 90C (see FIG. 1). One of the machines 90A, 90B, and 90C which is currently accessed by a user is referred to as the present machine. There is an IC card 20 assigned or corresponding to the present machine. Such an IC card 20 stores a machine ID signal or a machine-ID-related information piece and encryption key information for a master machine.

When the IC card 20 assigned to the present machine is inserted into the opening in the body of the present machine, the IC card 20 and a card reader/writer 11 in the encrypting apparatus 10A of the present machine are connected. In this case, the card reader/writer 11 reads out the machine ID signal or the machine-ID-related information piece and the encryption key information from the IC card 20. The card reader/writer 11 sends the read-out machine ID signal or the read-out machine-ID-related information piece and the read-out encryption key information to the selector 31 through the ID checker 12. The selector 31 chooses the read-out machine ID signal or the read-out machine-ID-related information piece and the read-out encryption key information sent from the card reader/writer 11. The selector 31 feeds the chosen machine ID signal or the chosen machine-ID-related information piece and the chosen encryption key information to the encryption key generator 32. The encryption key generator 32 produces a second encryption key (a master key) in response to the machine ID signal or the machine-ID-related information piece and the encryption key information fed from the selector 31. The encryption key generator 32 outputs the second encryption key to the encryptor 18.

There is an empty IC card 20 in which the memory 22 stores neither a machine ID signal nor a machine-ID-related information piece, and the memory 24 stores no encryption key information. When such an empty IC card 20 is inserted into the opening in the body of the present machine, the empty IC card 20 and the card reader/writer 11 in the encrypting apparatus 10A of the present machine are connected. In this case, the card reader/writer 11 can not read out a machine ID signal or a machine-ID-related information piece from the memory 22 within the currently-connected IC card 20. The card reader/writer 11 notifies the selector 31 that neither a machine ID signal nor a machine-ID-related information piece can be read out from the currently-connected IC card 20. In accordance with the notification from the card reader/writer 11, the selector 31 chooses a machine ID signal or a machine-ID-related information piece and encryption key information fed from the memories 13 and 14. The selector 31 feeds the chosen machine ID signal or the chosen machine-ID-related information piece and the chosen encryption key information to the encryption key generator 32. The encryption key generator 32 produces a first encryption key in response to the machine ID signal or the machine-ID-related information piece and the encryption key information fed from the selector 31. The encryption key generator 32 outputs the first encryption key to the encryptor 18.

Third Embodiment

Figure 5:
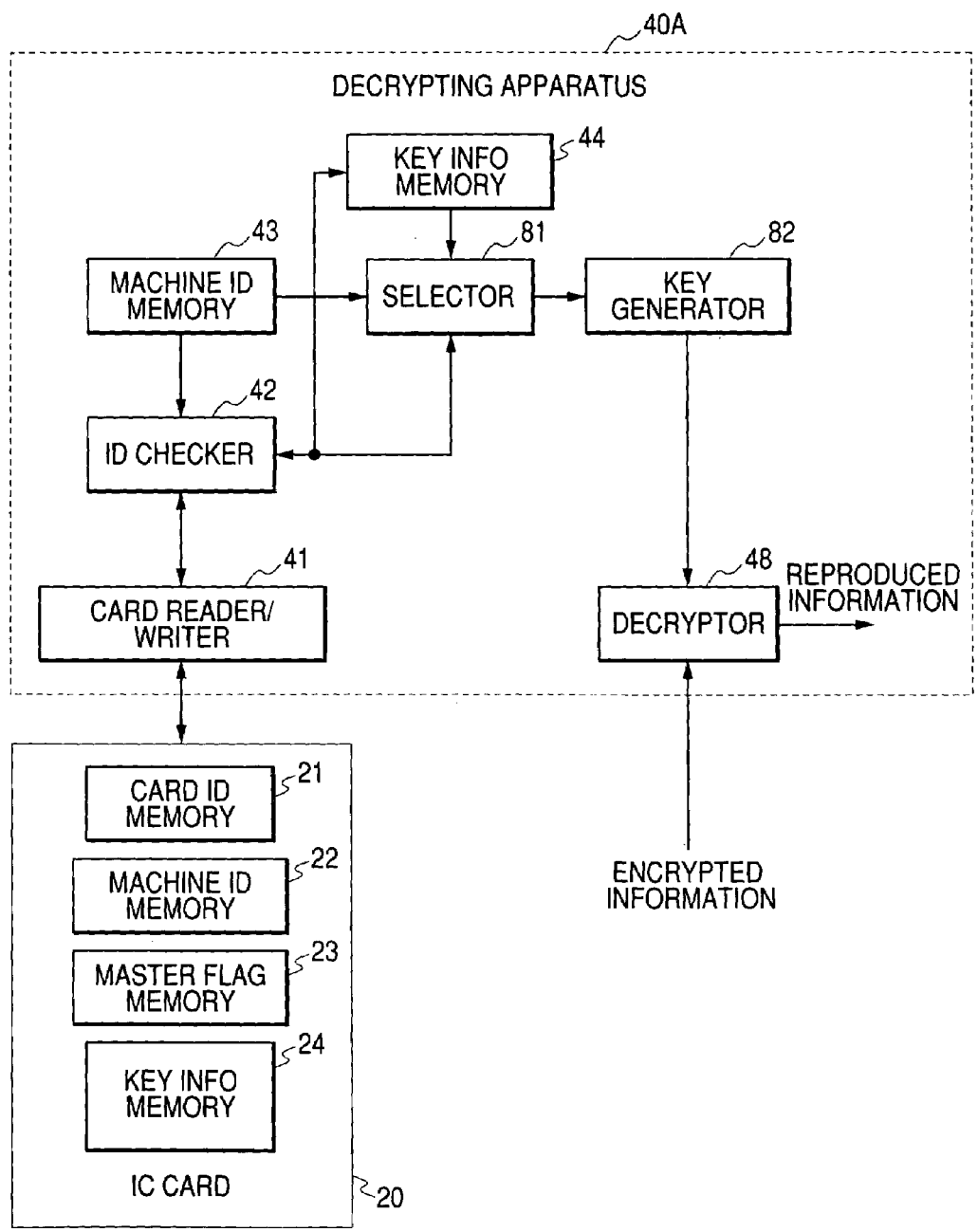
FIG. 5 is a block diagram of a decrypting apparatus and an IC card in a third embodiment of this invention.

FIG. 5 shows a decrypting apparatus 40A in a third embodiment of this invention which replaces the decrypting apparatus 40 in FIG. 3. The decrypting apparatus 40A in FIG. 5 is similar to the decrypting apparatus 40 in FIG. 3 except for design changes mentioned hereafter.

As shown in FIG. 5, the decrypting apparatus 40A includes a selector 81 and an encryption key generator 82. The selector 81 is connected among an ID checker 42, a memory 43, a memory 44, and the encryption key generator 82. The encryption key generator 82 is connected with a decryptor 48.

Generally, the decrypting apparatus 40A is provided in each of machines 90A, 90B, and 90C (see FIG. 1). One of the machines 90A, 90B, and 90C which is currently accessed by a user is referred to as the present machine. There is an IC card 20 assigned or corresponding to the present machine. Such an IC card 20 stores a machine ID signal or a machine-ID-related information piece and encryption key information for a master machine.

When the IC card 20 assigned to the present machine is inserted into the opening in the body of the present machine, the IC card 20 and a card reader/writer 41 in the decrypting apparatus 40A of the present machine are connected. In this case, the card reader/writer 41 reads out the machine ID signal or the machine-ID-related information piece and the encryption key information from the IC card 20. The card reader/writer 41 sends the read-out machine ID signal or the read-out machine-ID-related information piece and the read-out encryption key information to the selector 81 through the ID checker 42. The selector 81 chooses the read-out machine ID signal or the read-out machine-ID-related information piece and the read-out encryption key information sent from the card reader/writer 41. The selector 81 feeds the chosen machine ID signal or the chosen machine-ID-related information piece and the chosen encryption key information to the encryption key generator 82. The encryption key generator 82 produces a second encryption key (a master key) in response to the machine ID signal or the machine-ID-related information piece and the encryption key information fed from the selector 81. The encryption key generator 82 outputs the second encryption key to the decryptor 48.

There is an empty IC card 20 in which the memory 22 stores neither a machine ID signal nor a machine-ID-related information piece, and the memory 24 stores no encryption key information. When such an empty IC card 20 is inserted into the opening in the body of the present machine, the empty IC card 20 and the card reader/writer 41 in the decrypting apparatus 40A of the present machine are connected. In this case, the card reader/writer 41 can not read out a machine ID signal or a machine-ID-related information piece from the memory 22 within the currently-connected IC card 20. The card reader/writer 41 notifies the selector 81 that neither a machine ID signal nor a machine-ID-related information piece can be read out from the currently-connected IC card 20. In accordance with the notification from the card reader/writer 41, the selector 81 chooses a machine ID signal or a machine-ID-related information piece and encryption key information fed from the memories 43 and 44. The selector 81 feeds the chosen machine ID signal or the chosen machine-ID-related information piece and the chosen encryption key information to the encryption key generator 82. The encryption key generator 82 produces a first encryption key in response to the machine ID signal or the machine-ID-related information piece and the encryption key information fed from the selector 81. The encryption key generator 82 outputs the first encryption key to the decryptor 48.

It should be noted that sections exclusively for generating the first encryption key may be omitted from the decrypting apparatus 40A. The first encryption key in the decrypting apparatus 40A may be replaced by an encryption key held in common by the decrypting apparatuses in the machines 90A, 90B, and 90C.

Fourth Embodiment

Figure 6:
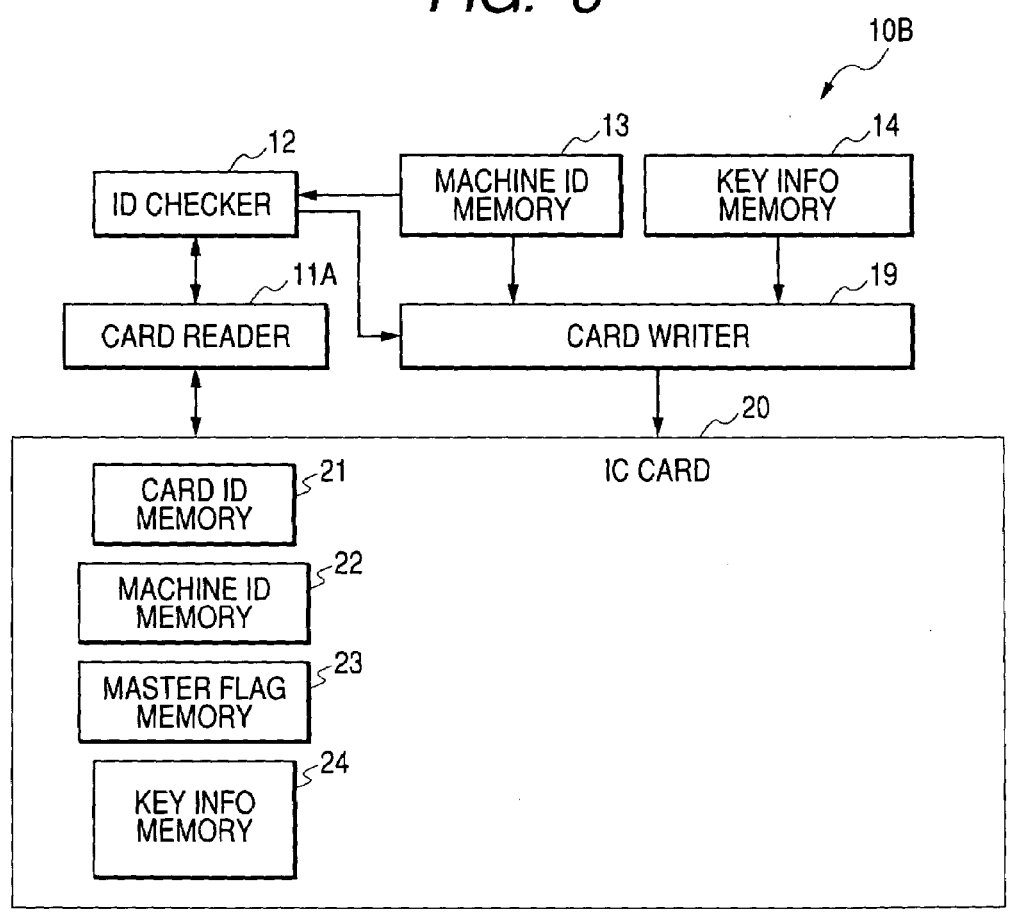
FIG. 6 is a block diagram of a portion of an encrypting apparatus and an IC card in a fourth embodiment of this invention.

FIG. 6 shows a portion of an encrypting apparatus 10B in a fourth embodiment of this invention which replaces the encrypting apparatus 10 in FIG. 2. The encrypting apparatus 10B in FIG. 6 is similar to the encrypting apparatus 10 in FIG. 2 except for design changes mentioned hereafter.

As shown in FIG. 6, the encrypting apparatus 10B includes a card reader 11A and a card writer 19. The card reader 11A replaces the card reader/writer 11 (see FIG. 2). The card writer 19 is connected with an ID checker 12 and memories 13 and 14. When an IC card 20 is inserted into the opening in the body of the present machine (90A, 90B, or 90C), the IC card 20 is connected with not only the card reader 11A but also the card writer 19 in the encrypting apparatus 10B of the present machine.

In the case where the present machine is a master, the encrypting apparatus 10B of the present machine operates as follows.

When an IC card 20 is inserted into the opening in the body of the present machine, the IC card 20 is connected with the card reader 11A and the card writer 19 in the encrypting apparatus 10B of the present machine. In this case, the card reader 11A reads out a card ID signal from the memory 21 within the IC card 20. In addition, the card reader 11A reads out a machine ID signal or a machine-ID-related information piece from the memory 22 within the IC card 20. Furthermore, the card reader 11A reads out encryption key information from the memory 24 within the IC card 20. In addition, the card reader 11A reads out a master flag from the memory 23 within the IC card 20. The card reader 11A passes the read-out card ID signal to the ID checker 12. A machine ID signal or a machine-ID-related information piece is sent from the memory 13 to the ID checker 12.

The ID checker 12 decides whether or not the card ID signal and the machine ID signal or the machine-ID-related information piece are in the prescribed relation. When the card ID signal and the machine ID signal or the machine-ID-related information piece are in the prescribed relation, the ID checker 12 concludes that the currently-connected IC card 20 corresponds to the present machine. On the other hand, when the card ID signal and the machine ID signal or the machine-ID-related information piece are not in the prescribed relation, the ID checker 12 concludes that the currently-connected IC card 20 corresponds to a machine different from the present machine. Furthermore, the ID checker 12 decides whether or not the card ID signal is legitimate on the basis of, for example, authentication or certification using RSA-based cryptography. The ID checker 12 notifies the results of the decisions, that is, the results of the conclusion and the decision, to the card reader 11A and the card writer 19.

When the notification from the ID checker 12 indicates that the currently-connected IC card 20 corresponds to a machine different from the present machine and the card ID signal is legitimate, the card writer 19 receives a machine ID signal or a machine-ID-related information piece and encryption key information from the memories 13 and 14. The card writer 19 stores the received machine ID signal or the received machine-ID-related information piece into the memory 22 within the IC card 20, for example, on an overwriting basis. In addition, the card writer 19 stores the received encryption key information into the memory 24 within the IC card 20, for example, on an overwriting basis.

When the notification from the ID checker 12 indicates that the currently-connected IC card corresponds to the present machine (the master machine), the card reader 11A decides whether the read-out master flag is "0" or "1". Alternatively, the ID checker 12 may decide whether the read-out master flag is "0" or "1". Provided that the read-out master flag is "0", the card writer 19 receives the machine ID signal or the machine-ID-related information piece and the encryption key information from the memories 13 and 14. In accordance with prescribed user's operation of the user interface of the present machine, the card writer 19 stores the received machine ID signal or the received machine-ID-related information piece into the memory 22 within the IC card 20, for example, on an overwriting basis. Furthermore, the card writer 19 stores the received encryption key information into the memory 24 within the IC card 20, for example, on an overwriting basis. On the other hand, when the read-out master flag is "1", the card writer 19 is inhibited from storing the received machine ID signal or the received machine-ID-related information piece and the received encryption key information into the memories 22 and 24 within the IC card 20.

Additional encryptors may be provided among the memories 13 and 14 and the card writer 19. In this case, the additional encryptors receive the machine ID signal or the machine-ID-related information piece and the encryption key information from the memories 13 and 14, and encrypt them to get an encryption-resultant signal or an encryption-resultant information piece and encryption-resultant key information. The additional encryptors output the encryption-resultant signal or the encryption-resultant information piece and the encryption-resultant key information to the card writer 19. The card writer 19 can store the encryption-resultant signal or the encryption-resultant information piece and the encryption-resultant key information into the memories 22 and 24 within the IC card 20. The additional encryptors provide higher security.

Fifth Embodiment

A fifth embodiment of this invention is similar to the first embodiment thereof except for design changes mentioned hereafter. According to the fifth embodiment of this invention, there are machines and IC cards in one home. The IC cards are assigned to the machines, respectively. The machines include a master machine and a slave machine. The master machine has a body formed with an opening for accommodating an IC card. The master machine is, for example, a transmitter. The slave machine has a body lacking an opening for accommodating an IC card. The slave machine is, for example, a mobile terminal. The IC card assigned to the master machine is referred to as a master card. The IC card assigned to the slave machine is referred to as a slave card.

Figure 7:
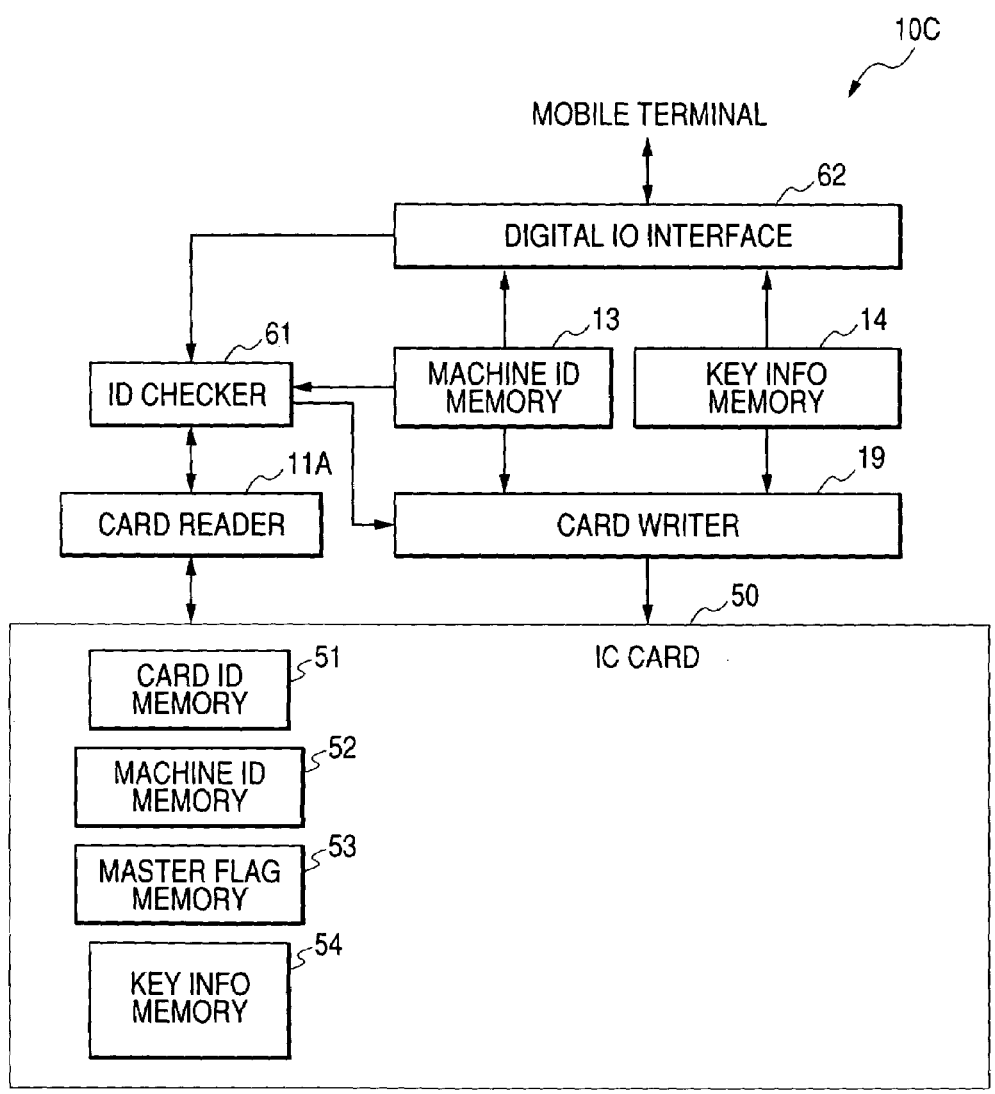
FIG. 7 is a block diagram of a portion of an encrypting apparatus and an IC card in a fifth embodiment of this invention.

FIG. 7 shows a portion of an encrypting apparatus 10C in the fifth embodiment of this invention which replaces the encrypting apparatus 10 in FIG. 2. The encrypting apparatus 10C in FIG. 7 is similar to the encrypting apparatus 10B in FIG. 6 except for design changes mentioned hereafter. The encrypting apparatus 10C is provided in the master machine.

As shown in FIG. 7, the encrypting apparatus 10C includes an ID checker 61 and a digital IO interface 62. The ID checker 61 replaces the ID checker 12 (see FIG. 6). The ID checker 61 is connected with the digital IO interface 62. The digital IO interface 62 is connected with memories 13 and 14. The digital IO interface 62 can be connected with the slave machine, that is, the mobile terminal, via a LAN (local area network) or a radio transmission line. The memory 13 stores a machine ID signal or a machine-ID-related information piece for the master machine. The memory 14 stores encryption key information for the master machine.

There is an IC card (a slave card) 50 assigned to the mobile terminal or the slave machine. The IC card 50 is similar to the IC card 20 (see FIG. 2). The IC card 50 has memories 51, 52, 53, and 54. The memory 51 is previously loaded with a card ID signal peculiar to the IC card 50. The memory 52 stores a machine ID signal peculiar to the mobile terminal (the slave machine). Alternatively, the memory 52 may store an information piece relating to the machine ID signal. The memory 53 stores a master flag. The memory 54 stores encryption key information peculiar to the mobile terminal (the slave machine).

When the IC card 50 assigned to the mobile terminal (the slave machine) is inserted into the opening in the body of the master machine, the IC card 50 is connected with the card reader 11A and the card writer 19 in the encrypting apparatus 10C of the master machine. Then, the card reader 11A reads out the card ID signal from the memory 51 within the IC card 50. The card reader 11A passes the read-out card ID signal to the ID checker 61. The machine ID signal or the machine-ID-related information piece is sent from the memory 13 to the ID checker 61.

The ID checker 61 decides whether or not the card ID signal and the machine ID signal or the machine-ID-related information piece are in the prescribed relation. When the card ID signal and the machine ID signal or the machine-ID-related information piece are in the prescribed relation, the ID checker 61 concludes that the currently-connected IC card 50 corresponds to the master machine. On the other hand, when the card ID signal and the machine ID signal or the machine-ID-related information piece are not in the prescribed relation, the ID checker 61 concludes that the currently-connected IC card 50 corresponds to a slave machine rather than the master machine. Furthermore, the ID checker 61 decides whether or not the card ID signal is legitimate on the basis of, for example, authentication or certification using RSA-based cryptography. The ID checker 61 notifies the results of the decisions, that is, the results of the conclusion and the decision, to the card reader 11A and the digital IO interface 62.

When the notification from the ID checker 61 indicates that the currently-connected IC card 50 corresponds to a slave machine and the card ID signal is legitimate, the card reader 11A reads out the machine ID signal or the machine-ID-related information piece from the memory 52 within the IC card 50 according to prescribed user's operation of the user interface of the master machine. The card reader 11A passes the read-out machine ID signal or the read-out machine-ID-related information piece to the ID checker 61. The ID checker 61 refers to the read-out machine ID signal or the read-out machine-ID-related information piece, and thereby detects a machine corresponding to the currently-connected IC card 50. The detected machine is, for example, the mobile terminal. The ID checker 61 notifies the detected machine to the digital IO interface 62. The digital IO interface 62 reads out the machine ID signal or the machine-ID-related information piece and the encryption key information for the master machine from the memories 13 and 14. The digital IO interface 62 establishes connection with the detected machine (the mobile terminal). Then, the digital IO interface 62 transmits the machine ID signal or the machine-ID-related information piece and the encryption key information for the master machine to the detected machine (the mobile terminal).

The card reader 11A may read out the encryption key information from the memory 54 within the IC card 50. In this case, a suitable device encrypts the machine ID signal or the machine-ID-related information piece and the encryption key information for the master machine in response to the read-out encryption key information. The digital IO interface 62 transmits the encryption-resultant version of the machine ID signal or the machine-ID-related information piece and the encryption key information for the master machine to the detected machine (the mobile terminal). The encryption of the machine ID signal or the machine-ID-related information piece and the encryption key information for the master machine enhances security.

Figure 8:
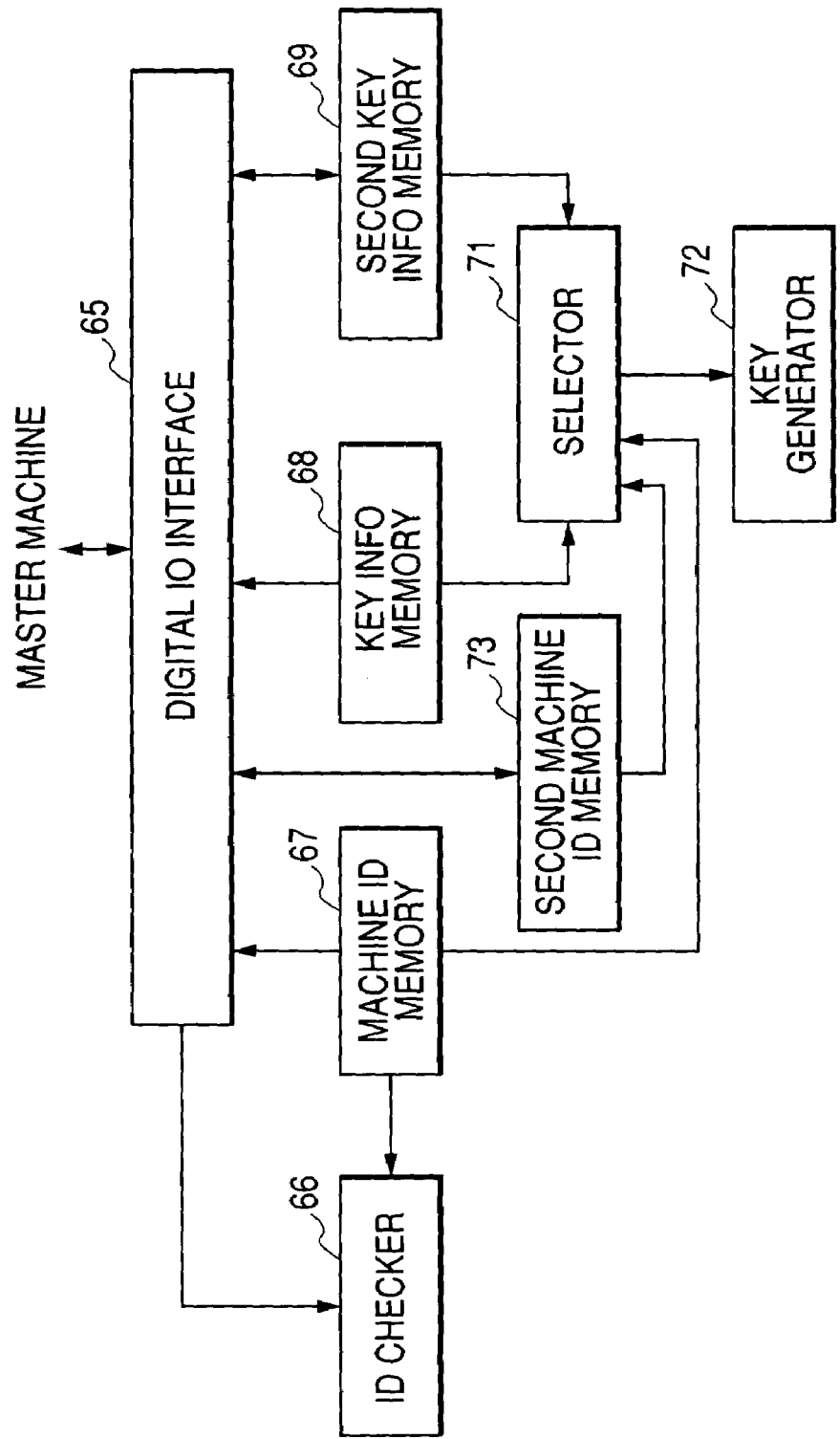
FIG. 8 is a block diagram of a portion of a mobile terminal in the fifth embodiment of this invention.

FIG. 8 shows a portion of the mobile terminal (the slave machine). As shown in FIG. 8, the mobile terminal includes a digital IO interface 65, an ID checker 66, memories 67, 68, and 69, a selector 71, an encryption key generator 72, and a memory 73.

The digital IO interface 65 can be connected with the master machine via the LAN or the radio transmission line. The digital IO interface 65 is connected with the ID checker 66, and the memories 67, 68, 69, and 73. The ID checker 66 is connected with the memory 67. The memories 67, 68, 69, and 73 are connected with the selector 71. The selector 71 is connected with the encryption key generator 72.

The memory 67 stores a machine ID signal peculiar to the mobile terminal. Alternatively, the memory 67 may store an information piece relating to the machine ID signal. The memory 68 stores encryption key information peculiar to the mobile terminal.

When the digital IO interface 65 is connected with the master machine, the digital IO interface 65 receives therefrom a machine ID signal or a machine-ID-related information piece for the master machine. The digital IO interface 65 passes the received machine ID signal or the received machine-ID-related information piece to the ID checker 66. The memory 67 feeds the machine ID signal or the machine-ID-related information piece to the ID checker 66. The ID checker 66 decides whether the currently-connected master machine is legitimate with respect to the mobile terminal (the slave machine) on the basis of the machine ID signal or the machine-ID-related information piece fed from the digital IO interface 65 and the machine ID signal or the machine-ID-related information piece fed from the memory 67. The ID checker 66 notifies the result of the decision to the digital IO interface 65.

Only when the decision result notified from the IC checker 66 indicates that the currently-connected master machine is legitimate, the digital IO interface 65 is permitted to receive encryption key information from the currently-connected master machine. Then, the digital IO interface 65 writes the received machine ID signal or the received machine-ID-related information piece into the memory 73. The digital IO interface 65 writes the received encryption key information into the memory 69.

The selector 71 accesses the memories 69 and 73 to decide whether or not the encryption key information and the machine ID signal or the machine-ID-related information piece are in the memories 69 and 73. When the encryption key information and the machine ID signal or the machine-ID-related information piece are not in the memories 69 and 73, the selector 71 transfers the machine ID signal or the machine-ID-related information piece and the encryption key information from the memories 67 and 68 to the encryption key generator 72. Thus, in this case, the selector 71 chooses the machine ID signal or the machine-ID-related information piece and the encryption key information in the memories 67 and 68. On the other hand, when the encryption key information and the machine ID signal or the machine-ID-related information piece are in the memories 69 and 73, the selector 71 transfers the machine ID signal or the machine-ID-related information piece and the encryption key information from the memories 69 and 73 to the encryption key generator 72. Thus, in this case, the selector 71 chooses the machine ID signal or the machine-ID-related information piece and the encryption key information in the memories 69 and 73.

The encryption key generator 72 produces an encryption key from the encryption key information and the machine ID signal or the machine-ID-related information piece chosen by the selector 71. The mobile terminal uses the produced encryption key to encrypt an information signal to be recorded or transmitted. The encryption key produced by the encryption key generator 72 can be identical with that of the master machine.

The master machine can encrypt an information signal in response to an encryption key of the master machine to get an encryption-resultant signal. The digital IO interface 62 in the master machine can transmit the encryption-resultant signal to the digital IO interface 65 in the mobile terminal (the slave machine) via the LAN or the radio transmission line. Thus, the digital IO interface 65 in the mobile terminal can receive the encryption-resultant signal. The mobile terminal decrypts the received encryption-resultant signal into the original information signal in response to the encryption key produced by the encryption key generator 72.

Sixth Embodiment

A sixth embodiment of this invention is similar to one of the first to fifth embodiments thereof except that removable recording mediums replace the IC cards.

Seventh Embodiment

A seventh embodiment of this invention is similar to one of the first to fifth embodiments thereof except that a memory for a machine ID signal or a machine-ID-related information piece, a memory for encryption key information, and a memory for a master flag are provided in each of machines rather than IC cards.

Eighth Embodiment

An eighth embodiment of this invention is similar to one of the first to fifth embodiments thereof except that the memory 22 in an IC card 20 stores a machine ID signal or a machine-ID-related information piece peculiar to a corresponding machine rather than that for a master machine. The memory 24 in the IC card 20 is loaded with encryption key information for the master machine. The master flags in different IC cards may be set to logic states as follows. The master flag in a master card is set to a logic state of "10". The master flag in a previous master card is set to a logic state of "11". The master flag in a slave card is set to a logic state of "00". This setting of the master flags enables a master card to be discriminated from other cards.

Ninth Embodiment

A ninth embodiment of this invention is similar to one of the first to fifth embodiments thereof except that digital IO interfaces replace card reader/writers, card readers, and card writers. According to the ninth embodiment of this invention, machines can be connected with each other via the digital IO interfaces, and machine ID signals or machine-ID-related information pieces and encryption key information can be transmitted between the machines via the digital IO interfaces.

Tenth Embodiment

A tenth embodiment of this invention is similar to one of the first to fifth embodiments thereof except for design changes mentioned hereafter. According to the tenth embodiment of this invention, a master machine and a slave machine are connected on a wired basis or a wireless basis. The master machine encrypts contents information to get encryption-resultant information. The master machine transmits the encryption-resultant information to the slave machine. The slave machine decrypts the encryption-resultant information to recover the original contents information.

Eleventh Embodiment

Figure 9:
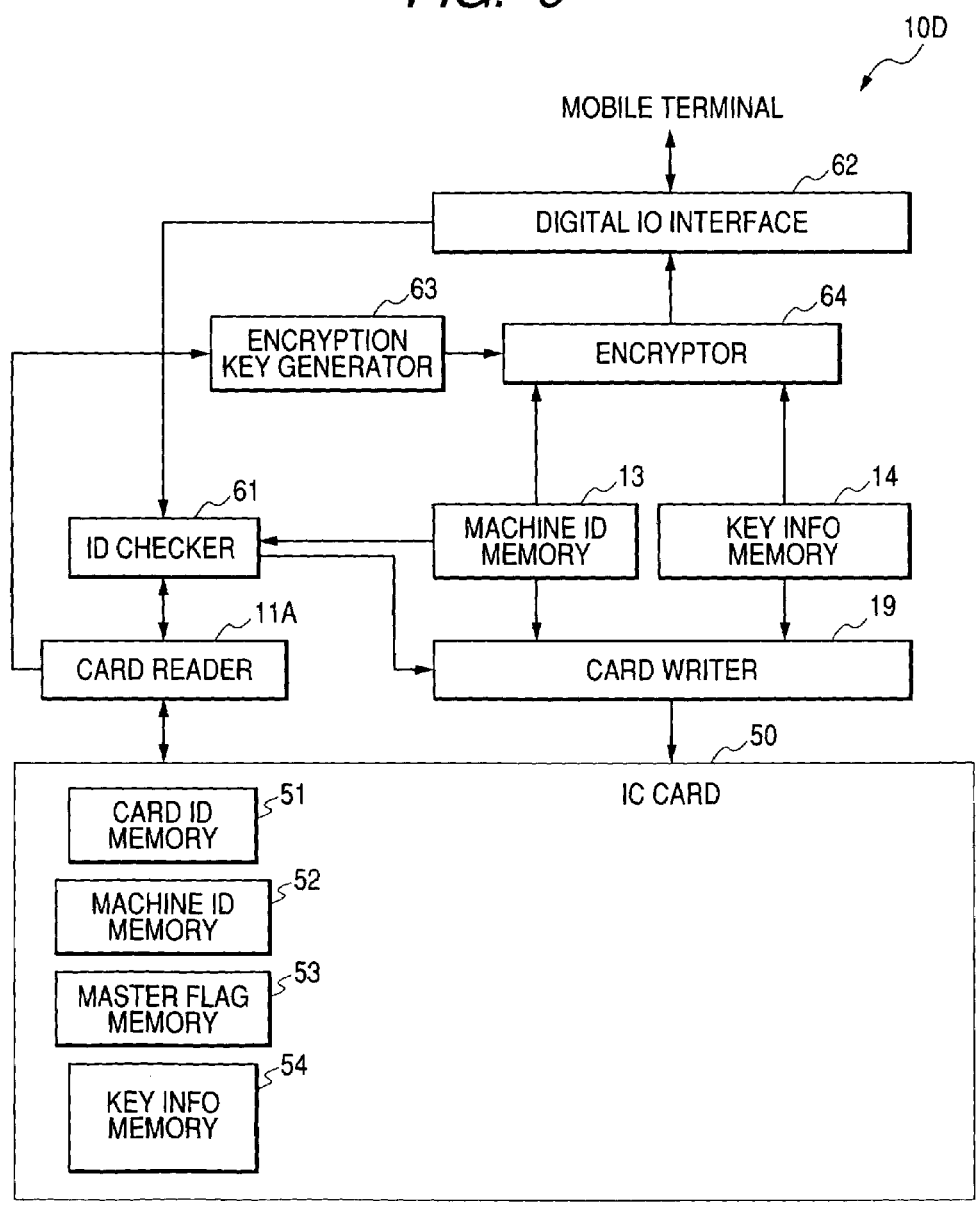
FIG. 9 is a block diagram of a portion of an encrypting apparatus and an IC card in an eleventh embodiment of this invention.
Figure 10:
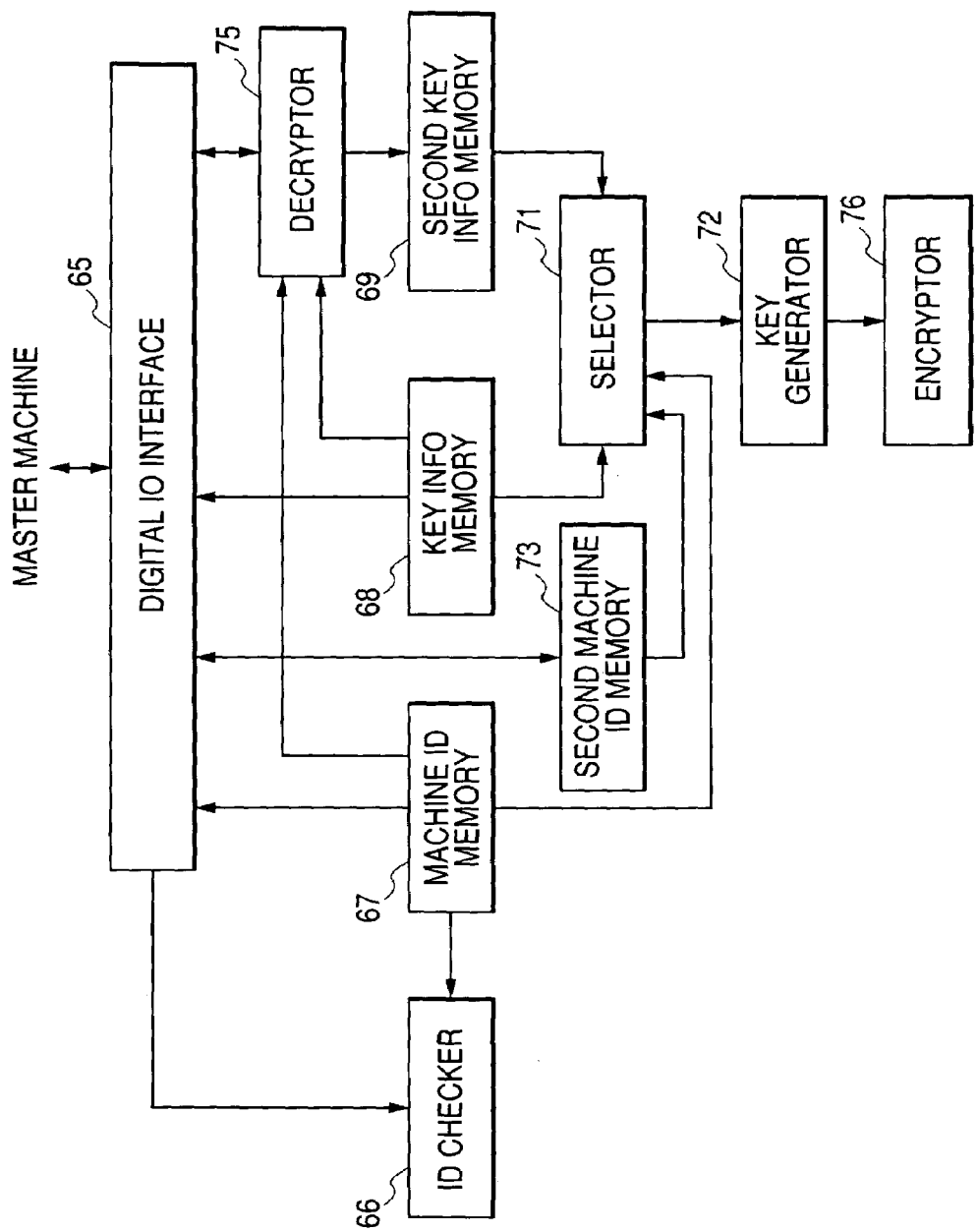
FIG. 10 is a block diagram of a portion of a mobile terminal in the eleventh embodiment of this invention.

An eleventh embodiment of this invention is similar to the fifth embodiment (see FIGS. 7 and 8) thereof. The eleventh embodiment of this invention includes an encrypting apparatus 10D and a mobile terminal which are modifications of the encrypting apparatus 10C (see FIG. 7) and the mobile terminal (see FIG. 8) in the fifth embodiment of this invention. The encrypting apparatus 10D is similar in structure and operation to the encrypting apparatus 10C (see FIG. 7) except for points mentioned later. The mobile terminal in the eleventh embodiment of this invention is similar in structure and operation to that in the fifth embodiment of this invention except for points mentioned later. FIG. 9 shows a portion of the encrypting apparatus 10D. FIG. 10 shows a portion of the mobile terminal in the eleventh embodiment of this invention.

Preferably, the apparatus portion shown in FIG. 9 is a key transmitting portion of the apparatus in FIG. 2 or FIG. 3 which is designed so that two different encryption keys can be selectively used. The apparatus portion in FIG. 9 is designed to send an encryption-resultant version of encryption key information to the mobile terminal. The apparatus portion in FIG. 9 can read out encryption key information and a machine ID signal or a machine-ID-related information piece from an IC card 50. In the apparatus portion of FIG. 9, an encryption key is produced from the encryption key information and the machine ID signal or the machine-ID-related information piece read out from the IC card 50. Encryption key information outputted from a memory 14 is encrypted in response to either the encryption key information read out from the IC card 50 or the produced encryption key to get an encryption-resultant version of the encryption key information. The apparatus portion in FIG. 9 sends the encryption-resultant version of the encryption key information to the mobile terminal.

As shown in FIG. 9, the encrypting apparatus 10D includes an encryption key generator 63 and an encryptor 64. The encryption key generator 63 is connected with a card reader 11A and the encryptor 64. The encryptor 64 is connected with a memory 13, the memory 14, and a digital IO interface 62.

The card reader 11A reads out encryption key information from a memory 54 within the IC card 50, and also reads out a machine ID signal or a machine-ID-related information piece from a memory 52 within the IC card 50. The card reader 11A passes the read-out encryption key information and the read-out machine ID signal or the read-out machine-ID-related information piece to the encryption key generator 63. The encryption key generator 63 produces an encryption key from the read-out encryption key information. The encryption key generator 63 may directly use the read-out encryption key information as an encryption key. Alternatively, the encryption key generator 63 produces an encryption key from not only the read-out encryption key information but also the read-out machine ID signal or the read-out machine-ID-related information piece. The encryption key generator 63 notifies the encryptor 64 of the produced encryption key.

The encryptor 64 reads out a machine ID signal or a machine-ID-related information piece and encryption key information for a master machine from the memories 13 and 14. The device 64 encrypts the machine ID signal or the machine-ID-related information piece and the encryption key information for the master machine in response to the encryption key notified by the encryption key generator 63. The encryptor 64 feeds the encryption-resultant version of the machine ID signal or the machine-ID-related information piece and the encryption key information for the master machine to the digital IO interface 62. The digital IO interface 62 establishes connection with a detected machine (a mobile terminal) notified by an ID checker 61. Then, the digital IO interface 62 transmits the encryption-resultant version of the machine ID signal or the machine-ID-related information piece and the encryption key information for the master machine to the detected machine (the mobile terminal).

As shown in FIG. 10, the mobile terminal in the eleventh embodiment of this invention includes a decryptor 75 and an encryptor 76. The decryptor 75 is connected among a digital IO interface 65 and memories 67, 68, and 69. The encryptor 76 is connected with an encryption key generator 72. The encryptor 76 may be replaced by a decryptor.

When the digital IO interface 65 is connected with a master machine, the digital IO interface 65 receives therefrom an encryption-resultant version of a machine ID signal or a machine-ID-related information piece for the master machine. The digital IO interface 65 passes the encryption-resultant version of the machine ID signal or the machine-ID-related information piece for the master machine to the decryptor 75. The memory 67 feeds a machine ID signal or a machine-ID-related information piece for the mobile terminal to the decryptor 75. The memory 68 feeds encryption key information for the mobile terminal to the decryptor 75. The decryptor 75 generates a decryption key (an encryption key) in response to at least one among the machine ID signal, the machine-ID-related information piece, and the encryption key information for the mobile terminal. The device 75 decrypts the encryption-resultant version of the machine ID signal or the machine-ID-related information piece for the master machine in response to the generated decryption key. Thus, the decryptor 75 implements decryption in response to at least one among the machine ID signal, the machine-ID-related information piece, and the encryption key information for the mobile terminal. The decryptor 75 returns the decryption result, that is, the machine ID signal or the machine-ID-related information piece for the master machine to the digital IO interface 65. Then, the digital IO interface 65 passes the machine ID signal or the machine-ID-related information piece for the master machine to an ID checker 66.

Only when a decision result notified from the IC checker 66 indicates that the currently-connected master machine is legitimate, the digital IO interface 65 is permitted to receive an encryption-resultant version of encryption key information for the master machine from the currently-connected master machine. Then, the digital IO interface 65 passes the encryption-resultant version of the encryption key information for the master machine to the decryptor 75. The device 75 decrypts the encryption-resultant version of the encryption key information for the master machine in response to the decryption key. Thus, the decryptor 75 implements decryption in response to at least one among the machine ID signal, the machine-ID-related information piece, and the encryption key information for the mobile terminal. The decryptor 75 writes the decryption result, that is, the encryption key information for the master machine into the memory 69.

The encryption key generator 72 feeds an encryption key to the encryptor 76. The encryptor 76 implements encryption of main information (for example, contents information) in response to the encryption key fed from the encryption key generator 72. As previously mentioned, the encryptor 76 may be replaced by a decryptor. In this case, the decryptor implements decryption of main information (for example, contents information) in response to the encryption key fed from the encryption key generator 72.

What is claimed is:

1. An encrypting apparatus (10) forming a master machine and comprising:
   a first memory (13) for storing a machine ID peculiar to the present encrypting apparatus (10);
   a second memory (14) for storing encryption key information corresponding to the machine ID peculiar to the present encrypting apparatus (10);
   first means (12) responsive to insertion of a recording medium (20) into the present encrypting apparatus (10);
   wherein the recording medium (20) can be inserted into and ejected from the present encrypting apparatus (10) and includes a recording-medium-ID memory (21) for storing a recording-medium ID being peculiar to the recording medium (20) and being preset to a value having a one-to-one correspondence relation with a machine ID peculiar to an encrypting apparatus, a machine-ID memory (22), and an encryption-key-information memory (24);
   the first means (12) being for comparing the machine ID stored in the first memory (13) and the recording-medium ID stored in the recording-medium-ID memory (21) within the recording medium (20) to decide whether or not the recording medium (20) corresponds to the present encrypting apparatus (10); and
   second means (11, 12) for in a case where the recording medium (20) corresponding to the present encrypting apparatus (10) is inserted into the present encrypting apparatus (10), transmitting the machine ID from the first memory (13) and storing the transmitted machine ID into the machine-ID memory (22) within the recording medium (20), and transmitting the encryption key information from the second memory (14) and storing the transmitted encryption key information into the encryption-key-information memory (24) within the recording medium (20), and for in a case where another recording medium corresponding to an encrypting apparatus forming a slave machine different from the master machine is inserted into the present encrypting apparatus (10), transmitting the machine ID from the first memory (13) and storing the transmitted machine ID into a machine-ID memory within said other recording medium, and transmitting the encryption key information from the second memory (14) and storing the transmitted encryption key information into an encryption-key-information memory within said other recording medium.

2. An encrypting apparatus (10) forming a slave machine and comprising:

a first memory (13) for storing a machine ID peculiar to the present encrypting apparatus (10);

a second memory (14) for storing encryption key information corresponding to the machine ID peculiar to the present encrypting apparatus (10);

first means (15 or 32) for generating a first encryption key on the basis of the machine ID stored in the first memory (13) and the encryption key information stored in the second memory (14);

second means (12) responsive to insertion of a recording medium (20) into the present encrypting apparatus (10);

wherein the recording medium (20) can be inserted into and ejected from the present encrypting apparatus (10) and includes a recording-medium-ID memory (21) for storing a recording-medium ID being peculiar to the recording medium (20) and being preset to a value having a one-to-one correspondence relation with a machine ID peculiar to an encrypting apparatus, a machine-ID memory (22) for storing a machine ID peculiar to an encrypting apparatus forming a master machine different from the slave machine, and an encryption-key-information memory (24) for storing encryption key information corresponding to the machine ID peculiar to the encrypting apparatus forming the master machine;

the second means (12) being for comparing the machine ID stored in the first memory (13) and the recording-medium ID stored in the recording-medium-ID memory (21) within the recording medium (20) to decide whether or not the recording medium (20) corresponds to the present encrypting apparatus (10);

third means (11, 12) for transmitting the machine ID and the encryption key information from the machine-ID memory (22) and the encryption-key-information memory (24) within the recording medium (20) when the second means (12) decides that the recording medium (20) corresponds to the present encrypting apparatus (10);

fourth means (16 or 32) for generating a second encryption key on the basis of the machine ID and the encryption key information transmitted by the third means (11, 12);

fifth means (17) for selecting one from the first encryption key generated by the first means (15 or 32) and the second encryption key generated by the fourth means (16 or 32); and sixth means (18) for encrypting an information signal in response to the encryption key selected by the fifth means (17).

3. An encrypting apparatus (10) as recited in claim 2, wherein the fifth means (17) comprises means (17) for selecting the second encryption key when the second means (12) decides that the recording medium (20) corresponds to the present encrypting apparatus (10).

4. An encrypting apparatus (10) forming a slave machine and comprising:

a first memory (13) for storing a machine ID peculiar to the present encrypting apparatus (10);

a second memory (14) for storing first encryption key information corresponding to the machine ID peculiar to the present encrypting apparatus (10);

first means (11) responsive to insertion of a recording medium (20) into the present encrypting apparatus (10);

wherein the recording medium (20) can be inserted into and ejected from the present encrypting apparatus (10) and includes a third memory (22) for storing a machine ID peculiar to an encrypting apparatus forming a master machine different from the slave machine, and a fourth memory (24) for storing second encryption key information corresponding to the machine ID peculiar to the encrypting apparatus forming the master machine;

the first means (11) being for transmitting the machine ID and the second encryption key information from the third memory (22) and the fourth memory (24) within the recording medium (20);

second means (14A) for generating third encryption key information from the machine ID and the second encryption key information transmitted by the first means (11) and the machine ID stored in the first memory (13), and for storing the generated third encryption key information into the second memory (14); and third means (11) for writing the machine ID from the first memory (13) into the third memory (22) within the recording medium (20), and writing the third encryption key information into the fourth memory (24) within the recording medium (20).

5. An encrypting apparatus as recited in claim 4, wherein the recording medium (20) includes a fifth memory (23) for storing a master flag, and further comprising fourth means (11) for changing the master flag in the fifth memory (23) within the recording medium (20) to inhibit transfer of the machine ID and the third encryption key information, which have been written by the third means (11), from the third memory (22) and the fourth memory (24) within the recording medium (20).

* * * * *